United States Patent
Shuklabaidya et al.

(10) Patent No.: US 10,068,304 B1
(45) Date of Patent: Sep. 4, 2018

(54) VENDOR MATCHING ENGINE AND METHOD OF USE

(71) Applicant: Stoqos, LLC, Lorton, VA (US)

(72) Inventors: Prashant Shuklabaidya, Washington, DC (US); Valentin G. Pavel, Arlington, VA (US); Leandro N. Giglioli, Silver Spring, MD (US)

(73) Assignee: Stoqos, LLC, Lorton, VA (US)

( * ) Notice: Subject to any disclaimer, the term of this patent is extended or adjusted under 35 U.S.C. 154(b) by 0 days.

(21) Appl. No.: 15/819,271

(22) Filed: Nov. 21, 2017

Related U.S. Application Data

(63) Continuation of application No. 15/804,233, filed on Nov. 6, 2017.

(51) Int. Cl.
| | |
|---|---|
| *G06Q 50/26* | (2012.01) |
| *G06Q 30/06* | (2012.01) |
| *G06Q 40/06* | (2012.01) |
| *G06Q 10/10* | (2012.01) |

(52) U.S. Cl.
CPC ........ *G06Q 50/26* (2013.01); *G06Q 10/1053* (2013.01); *G06Q 30/0611* (2013.01); *G06Q 40/06* (2013.01)

(58) Field of Classification Search
None
See application file for complete search history.

(56) References Cited

U.S. PATENT DOCUMENTS

| | | | | |
|---|---|---|---|---|
| 7,640,113 | B2* | 12/2009 | Frudakis | G06F 19/18 |
| | | | | 702/19 |
| 9,355,358 | B1* | 5/2016 | Kramer | G06N 5/02 |
| 2002/0107723 | A1* | 8/2002 | Benjamin | G06Q 10/04 |
| | | | | 705/7.29 |
| 2003/0084014 | A1* | 5/2003 | Sohrabi | G06Q 10/10 |
| | | | | 706/20 |

OTHER PUBLICATIONS

Sali Li, Anoop Madhok, Gerhard Plaschk, Rohit Verma Dr, Supplier-Switching Inertia and Competitive Asymmetry: A Demand-Side Perspective, Cornell University School of Hotel Administration Collection The Scholarly Commons (Year: 2006).*

* cited by examiner

*Primary Examiner* — Kurtis Gills
*Assistant Examiner* — Akosua Kyereme-Tuah
(74) *Attorney, Agent, or Firm* — Maier & Maier, PLLC

(57) ABSTRACT

A vendor matching engine and method of use, which may be used by a prospective bidder on a government contract or another prospective selectee in order to determine which bids or applications are most worthwhile to pursue. The engine may perform steps of retrieving transactional or vendor registry information, such as Federal Procurement Data System data or System for Award Management data, and may then use this data to generate matchability scores characterizing the compatibility between the selector and selectee. To generate these scores, the distances between selector and selectee coordinates in n-dimensional space may be used in order to determine how similar the prospective selectee is to the selector's desired selectee, allowing a (Continued)

vendor to prioritize government contracts for which they may be best suited. The system may also be used for other pairings of applicants and awarding parties, such as universities and research granting organizations.

20 Claims, 17 Drawing Sheets

VENDOR MATCHING ENGINE AND METHOD OF USE

CROSS-REFERENCE TO RELATED APPLICATIONS

This application is a continuation of and claims priority from U.S. patent application Ser. No. 15/804,233, filed on Nov. 6, 2017, entitled "Vendor Matching Engine and Method of Use," the entire contents of which are hereby incorporated by reference.

BACKGROUND

United States federal government contracts represent a tremendous sales and revenue opportunity for government contractors both large and small. The United States federal government advertises itself as the "world's largest customer," and purchases all types of products and services in quantities both large and small, over all kinds of timescales.

The federal government has a number of stated objectives it aims to accomplish through its contracting process, and which generally govern its rules and regulations. First, the government intends to ensure that competition between contractors is fair and open, and to this end, the process of requesting proposals, evaluating bids, and making awards is provided with full visibility so as to promote a level playing field between potential contractors, and so as to ensure that any business that is qualified to bid will be considered. Second, the government intends to ensure that products and services are competitively priced, and seeks transparency and fair competition in order to ensure this objective as well. Third, the government seeks to ensure that it gets what it pays for, and as such carefully defines requirements, terms, and conditions for all purchases, and requires contractors to document compliance with these requirements. Fourth, the government seeks to ensure that all parties comply with all applicable law, such as the Federal Acquisition Regulation (FAR) or the Defense Acquisition Regulation Supplement (DFARS), as well as any organization-specific rules.

Small businesses, in particular, have significant opportunities to engage with the federal government procurement process. The federal government is required by law to provide opportunities for small businesses for a variety of reasons, including ensuring competition among vendors, promoting development of new businesses and new business ideas, and promoting opportunities for disadvantages socio-ethnic groups. To this end, government agencies typically reserve some set portion of their acquisitions as "set-asides" for small businesses. Often, these "set-asides" consist of certain types of tasks on larger contracts, though in some cases entire contracts may be designed for smaller businesses.

The bidding process for federal contracts is done through a system of primary contractors and subcontractors. Prime contractors bid on and win contracts directly from government agencies. After the contract is awarded to the prime contractor, the prime contractor becomes legally responsible for all aspects of fulfilling the contract, such as interacting with the government agency that is a customer for the contract, recruiting necessary staff, organizing and managing any subcontractors that may be necessary, and meeting all delivery requirements. Subcontractors then are contracted to join the primary contractor's team in order to provide specific services. Both prime contractors and subcontractors must register as government contractors, but only the prime contractor engages with the bidding process, and often only the prime contractor interacts with the client.

Despite the significant opportunities that may be available for small and large businesses alike through the government contracting process, many businesses have abandoned any thought of even trying to find government contracts, let alone aggressively pursuing or bidding on them. Many contractors become frustrated, in particular, by the Request for Proposal (RFP) process to bid on contracts. Government RFPs can often be complicated and difficult to read, and can require some legal analysis to decipher. The costs involved in doing so often mean that contractors do not find the bid process to be worthwhile unless they can better target their approaches before having to read the RFPs, which is often difficult.

In particular, many contractors do not engage in any kind of effort to submit proposals unless they have access to intelligence on the agency that submitted the RFP (in order to determine whether their company is likely to be approved), access to intelligence on probable competitors (in order to determine whether one or more other companies are likely to be approved), and a bid strategy that is formulated in light of experience with the bidding process. (The last, in particular, is generally difficult for contractors who do not have experience with the bidding process, meaning that the vast majority of small businesses do not typically try to compete for contracts, and small business contractors are often serial bidders set up specifically to take advantage of set-aside funds.)

It has been found that these inefficiencies in the procurement process lead to a significant amount of government waste in many governments around the world, including the United States federal government. For example, one study by the Italian government found that the central administration paid on average 22% more than health authorities and universities, which had a looser procurement process, and that these increased costs were almost all due to "passive waste" (i.e. waste due to inefficiency in the bidding process) rather than "active waste" (waste due to corruption). Studies by the U.S. federal government have shown only slightly better results. One of the federal government's main workarounds, to date, has been increasing the number of no-bid contracts that are awarded, typically something that is just done when the federal government needs urgent action, has identified the vendor as having specialized expertise, or has a longstanding relationship with a particular supplier that they want to preserve; these contracts save time in procuring equipment and services, but lack the opportunity for competitive bidding that can drive down prices, and as such present the opportunity for additional inefficiencies of their own.

SUMMARY

A system for determining the compatibility of a vendor and a government organization through a vendor matching engine may be disclosed. Such a system may be used to aid the vendor in a pre-bidding decision-making process, allowing the vendor to better allocate their resources for preparing bids, and increase their efficiency at the time of bidding for a particular contract.

In another exemplary embodiment, a vendor matching engine may be configured to match any vendor or any grant receiving organization to a federal contractee or grant providing organization. As such, a grant receiving organization, such as a university, may be better able to evaluate grant reception opportunities (such as government contracting opportunities) during a grant application process, and may allow the organization to better allocate their resources and increase efficiency when bidding for a particular government contract or grant.

A vendor matching engine such as may be disclosed herein may further serve the interests of the federal government (or any other government which may be engaging in a contracting process) by improving the efficiency with which potential contractors may operate. This may serve the government's stated objective of supporting small businesses as engines of economic development and job creation by ensuring that federal funding (particularly federal set-aside funding) is better distributed and is more likely to reach businesses that are not serial government contractors.

According to an exemplary embodiment, a vendor matching engine may be used essentially as follows. First, the vendor matching engine may retrieve, with a processor, from an awarding party (such as the General Services Administration (GSA) or Department of Defense (DOD)), historical award information (such as Federal Procurement Data System (FPDS) data) and/or other stored information, such as registry information for the vendors (such as System for Award Management (SAM) data). This historical award information may include a plurality of initial variables defining a plurality of applicant characteristics. Once this data set is acquired, it may be stored in a memory.

Next, the vendor matching engine may execute a cleaning or pre-processing step. According to an exemplary embodiment, in a pre-processing step, a vendor matching engine may clean and normalize the data for use in the remainder of the process, such as may be described below.

Next, the vendor matching engine may execute a variable selection step, in order to select one or more attributes that best describe the various entities that may be identified in the initial data set. (For example, according to an exemplary embodiment in which historical award information is retrieved from a government award repository such as FPDS, entities that may be selected and extracted through a variable selection step may be, for example, contracts, agencies, and vendors, where agencies have granted contracts to vendors.) This may allow each entity to be described by a set of one or more attributes. According to an exemplary embodiment, in a variable selection step, a vendor matching engine may select a plurality of selected variables from the plurality of initial variables based on the completeness, imputability, and lack of redundancy of the selected variables; in order to do this, the vendor matching engine may identify which variables are incomplete, resistant to imputation, or which are redundant, and may reject those variables. The vendor matching engine may then discretize and standardize the selected variables.

The vendor matching engine may next impute, with a processor, one or more missing variable values in the plurality of selected variables (if any are missing) based on logical rules, and may then add the missing variable values to the set of selected variables.

The vendor matching engine may then collect the selected variables in one or more categories, such as, for example, a plurality of variables containing information about the selectee or vendor (selectee variables) or a plurality of variables containing information about the selector or selection process, such as the government agency (selection variables). These selected variables may then be aggregated.

In a next step, in order to apply the desired algorithm, which may be based on the Fuzzy Multiple Correspondence Analysis algorithm (FMCA) and which may be referred to as an Aggregative Fuzzy Multiple Correspondence Analysis Algorithm or AFMCA algorithm, the data may be structured in a particular way before application of the algorithm. (Alternatively, another algorithm may be used, as desired.) In order to properly structure the data, according to an exemplary embodiment, one or more observational units of interest corresponding to one or more of the ID variables that may have been included in the analysis having unique levels may be defined, and the unique levels of the particular observational unit of interest may be identified.

In a next step, the data may be transformed based on the observations identified in the previous step. This may be, for example, a dummification step, in which the selected variables (excluding ID variables) may be dummified in order to convert them into binary variables. According to an exemplary embodiment, each level of one or more of the ID variables that may have been included in the analysis may thus become its own observational unit of interest, which may result in a matrix having only binary data.

Once the dummified data has been assembled, the system may perform an AFMCA process. According to an exemplary embodiment, the system may proceed along two tracks, a first track beginning with a selector aggregation process and which may in some exemplary embodiments make use of, for example, historical award data (such as FPDS data), and a second track beginning with a selectee aggregation process and which may in some exemplary embodiments make use of, for example, registry information or other selectee data (such as SAM data) as well as historical award data. (Other arrangements of aggregating data may also be understood and may be implemented as desired.)

In a next step, along a first track, the vendor matching engine may calculate coordinates for the selecting or awarding party (such as the government entity) in a coordinate space. The step of calculating selector coordinates in the coordinate space may include aggregating the selector data into a selector profile dataset by aggregating the dummified variables that had been previously selected in a variable selection step; this aggregation may be done by, for example, agency ID or other selector ID, or may be done through another process such as may be desired. The step of calculating selector coordinates may further include transforming the selector profile dataset into a matrix of proportions, and then generating a matrix of inertias based on the matrix of proportions. This matrix of inertias may then be decomposed, using Generalized Single Value Decomposition (GSVD), into a set of coordinates, which may then be used to create the selector AFMCA coordinate space which may be used to compare data points.

In a next step, along a second track, the vendor matching engine may perform similar calculations for the selectee or award receiving party (such as a vendor contracted by a government entity) in order to project it onto the same coordinate space. The step of calculating selectee coordinates in the coordinate space may include aggregating the selectee data into a selectee profile dataset by aggregating the dummified variables that had been previously selected in a variable selection step; this aggregation may be done by, for example, vendor ID or other selectee ID, or may be done through another process such as may be desired. The step of calculating selectee coordinates may further include transforming the selectee profile dataset into a matrix of proportions, and then generating a matrix of inertias based on the matrix of proportions. Once this table of inertias has been generated, it may be projected into the selector AFMCA coordinate space that had been previously obtained using Generalized Single Value Decomposition.

The vendor matching engine may then calculate a plurality of distances between each selector or awarding party coordinate set in the coordinate space and each selectee or applicant coordinate set in the coordinate space. This may be used to generate a table of selectee scores based on the distances. This may, in some exemplary embodiments, include a score of the prospective selectee or applicant, which may be based on the distance between the selectee's own scores and the scores of the government agencies. In other exemplary embodiments, other scores for one or more other applicants may be generated. In some exemplary embodiments, generation of or access to scoring information may be restricted to particular applicants, such as by using access controls; for example, according to an exemplary embodiment, applicants may only be able to access scores for themselves, and/or may only have access to more limited scoring information for other potential applicants. Based on these scores, the vendor matching engine may generate at least one recommendation tailored to the prospective applicant.

In other exemplary embodiments, one or more of the steps described may be varied or simplified. For example, according to an exemplary embodiment, a vendor matching engine may not calculate a matrix of inertias for at least one of the selector or the selectee; instead, another mathematical transformation function, or no mathematical transformation function, may be applied to the matrix of proportions. Likewise, any method of calculating distances or of calculating scores based on distances may be understood; for example, it may be desirable to generate a score based on a linear function that scales evenly with distance (for example, normalizing a distance score from 0-100) or may be desirable to generate a score based on a nonlinear function that does not scale evenly with distance (such as, for example, an exponential curve that may be used to give more weight to small distances when the selector and selectee coordinates are closer together than when they are farther apart, which may be used to distinguish between somewhat similar vendors more readily).

In an exemplary embodiment, a user may be able to add information, such as one or more new applicants to be considered, to the results produced by a vendor matching engine. This may result in the vendor matching engine performing the vendor-side calculations for that new vendor (for example, the vendor matching engine may not perform a step of calculating government entity coordinates, but may perform other steps relevant to the vendor) and new scores being generated, as desired.

In some exemplary embodiments, the system may be used to match, for example, government contract vendors to government contracts (which may be done at, for example, any level of the government; for example, a government may be a municipal/local, county, state, or federal government agency, or may be a foreign government), vendors to other contracts (such as analogous systems operated by large companies rather than a government), universities or other parties to grant institutions, employees to employers, investors to investment opportunities, students to educational institutions or scholarships, and so forth. In some exemplary embodiments, it may be desirable to insert one or more additional steps directed to compiling data when registry information or selector/selectee information is not provided through a public and readily accessible system, such as the SAM registry; for example, according to an exemplary embodiment in which it is desirable to see which students are likely to find it useful to apply for which scholarships, scholarship information may be made publicly available by a wide variety of public and private parties, and the vendor matching engine may scrape this data from where it can be found online and compile it in a data acquisition step, before pre-processing and the like are performed.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
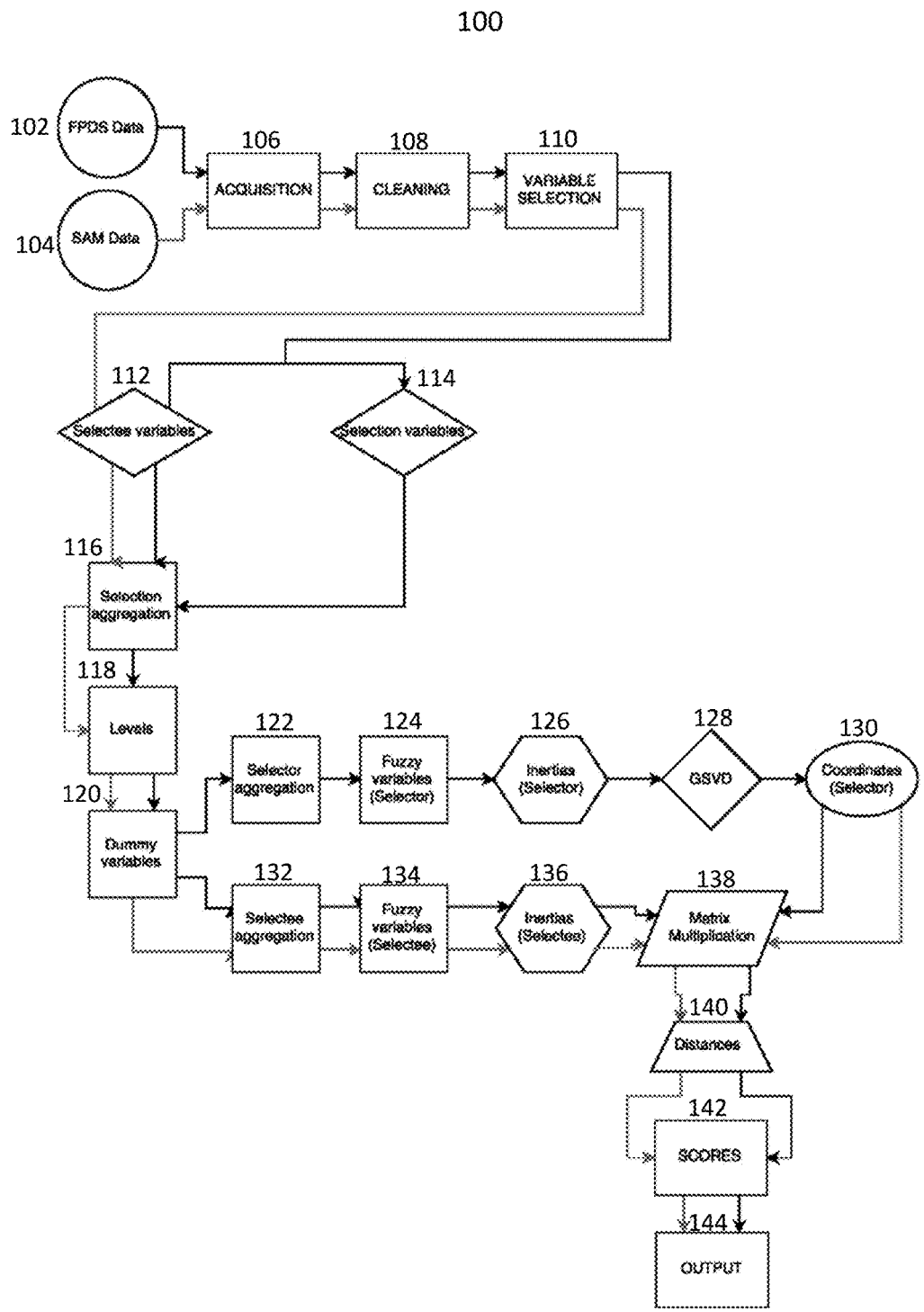
FIG. 1 is an exemplary flowchart depicting an exemplary embodiment of a process of generating a matchability score using a vendor matching engine.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, as used herein, the term "matchability" may refer to an abstract measure of compatibility between a selecting entity (selector/awarding party) and a potentially selected entity (selectee/award receiving party), such as, for example, governmental entities and vendors, that captures a compatibility or contracting potential between those entities. The term "matchability score" may refer to a scoring system for matchability, which may be, for example, a system that translates the Euclidean distances between principal coordinates in the AFMCA space into a quantity ranging from 0 to 100 that has a uniform distribution among all vendors for each agency and overall. The terms "bidder pool" and "eligible bidder pool" both refer to the set of eligible bidders, a subset of vendors which may be filtered by statutory requirements, such as NAICS code and Type of Set Aside. The term "eligible contracts" may be used to refer to new contracts; for example, in an exemplary embodiment, these contracts may be those present in a current year's dataset (for example, a 2016 dataset) but not present in a previous year's dataset (for example, a 2015 dataset). This may be referred to with the term "Current Year Data Set," or by reference to a specific year, such as "2016 Only Data Set," which may refer to the data set of all contractors who were awarded contracts in 2016 but not in 2015. Likewise, the term "full data set" may refer to a data set that contains all contractors who were awarded contracts in a particular year or collection of years.

According to an exemplary embodiment, an exemplary dataset may have a vendor space and a contract space. The term "vendor space" may refer to an AFMCA space generated using the organizational attributes within the dataset (i.e. those attributes describing the vendors or selectees when the exemplary dataset is federal government contract data), and the term "contract space" may refer to an AFMCA space generated using the contractual attributes within the dataset (i.e. those attributes describing the contracts or transactions when the exemplary dataset is federal government contract data).

According to an exemplary embodiment, one or more inertias may be calculated within this space, with the inertia being a measure of surprise or deviation from expectation (essentially an MCA analogue to the $\chi^2$ statistic).

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of processes to be executed by a vendor matching engine may be disclosed.

Turning now to exemplary FIG. 1, FIG. 1 displays an exemplary embodiment of a process by which a vendor matching engine may generate a matchability score 100. According to an exemplary embodiment, a matchability score may provide a quantitative measurement of the degree of compatibility that a given vendor or grant receiving organization may possess with a government entity, such as a federal or local government entity, or other organization that may be granting an award or requesting bids for a contract. Such a measurement may be based on, for example, the past interactions between vendors and government entities, such as historical contract award data, or based on the interactions (or other basis for similarity) of any other selectors/awarding parties and any other selectees/award receiving parties. Throughout the document, a selecting party may be variously referred to as a selector, awarding party, government agency, or other such term, and a party to be selected by the selecting party may be variously referred to as a selectee, award receiving or applicant party, vendor, or other such term; however, it is understood that the use of a term such as "awarding party" or "government agency" in an exemplary embodiment does not limit the application of the exemplary embodiment to use with any particular selector, and the use of a term such as "applicant party" or "vendor" in an exemplary embodiment does not limit the application of the exemplary embodiment to use with any particular selectee.

According to an exemplary embodiment, a vendor matching engine may make use of an adaption of Fuzzy Multiple Correspondence Analysis (FMCA), or another such technique, in order to obtain a similarity result. (Such an adaption may be referred to as "Aggregative Fuzzy Multiple Correspondence Analysis," or "AFMCA," and will be described in more detail later by reference to exemplary FIG. 1.) Multiple Correspondence Analysis (MCA) is a data analysis technique for nominal categorical data, which may be used to detect and represent the underlying structures that may be present in a data set. This is accomplished by representing data as points in a low-dimensional Euclidean space, and determining similarity between data points by determining the proximity between the data points in the Euclidean space. Fuzzy clustering, also known as soft clustering, is a technique in which data is arranged into clusters identified via similarity measures, in such a fashion that each data point may belong to more than one cluster. FMCA, or "Fuzzy MCA," combines these two techniques; for example, FMCA may involve calculating the centroid of each fuzzy cluster and determining the similarity between the clusters based on the centroid. MCA or FMCA may be used in many applications in which it is desired to match a large set of categorical variables to another; for example, MATCH.COM or other job search sites may make use of similar techniques to match candidates to jobs.

A distinction may be made, for the purposes of further defining a FMCA, MCA, and AFMCA process, between "active" observations and "passive" observations. The number of active observations may be used to determine the dimensionality of the MCA space (such as the AFMCA space) being constructed, with the number of dimensions being one less than the number of active observations.

For example, according to an exemplary embodiment, when the "active observations" for AFMCA purposes are defined as being particular government agencies (for one exemplary embodiment, this may be, for example, the 10 agencies of the Department of Homeland Security (DHS), each of which may be an active observation) the resulting space may be 9-dimensional. As such, the AFMCA space may effectively be a space of the selectors (such as government agencies), to which the selectees (such as vendors) may be projected in order to determine their resulting location within the constructed AFMCA space.

In particular, according to an exemplary embodiment, a vendor matching engine may make use of an AFMCA-based determination of the distances between the locations of governmental entities (such as, for example, federal departments and their constituent agencies, or independent federal agencies) and the locations of vendors in order to generate a matchability score for a particular vendor, which may characterize the degree to which the vendor matches a typical or ideal profile for the governmental entity (e.g. governmental department or agency) in question. This score may thus be used to provide the vendor with a score encapsulating certain insights into the contracting potential they have with particular government agencies, or the contracting potential they have for certain contracts. This may allow the vendor to use their time and resources more efficiently by allowing the vendor to more ably conduct their pre-bidding decision-making process by more accurately evaluating contracting opportunities during the bidding process or the process of applying for grant applications.

According to some exemplary embodiments, given that techniques like MCA and FMCA may be applied to other fields such as matching job candidates to jobs, a vendor matching engine may be configured or reconfigured to function in any area or for any purpose in which there exists two classes of entities, in which one class performs a selection between one or more members of the other class for a future event, and in which both classes of entities can be described using the same set of categorical variables. Such purposes may include, but are not limited to, matching employees to employers, matching investors to investment opportunities, matching prospective students to educational institutions or scholarships, matching charitable donors to charitable organizations, and so forth.

In some other exemplary embodiments, a vendor matching engine may be used for purposes other than matching, as well; for example, it may be desirable to use it to conduct oversight of a government agency (such as the departments thereof) or a body of government agencies, a business or set of businesses, and so forth. For example, according to an exemplary embodiment, a vendor matching engine may be used to discover whether a particular government agency is unlawfully discriminating against vendor businesses which are owned or operated by particular employees (such as employees of a particular race, gender, and so on). In another example, a vendor matching engine may be used to identify gaps in procurement data; for example, it may be determined from a vendor matching engine that the value of contracts submitted by a particular agency is much less than the funding that they were allocated, and a reason for this may be determined, such as whether the responsible contracting officers have failed to update their procurement data because they were negligent of their job responsibilities or because they were conducting procurement contrary to federal rules. Any other such applications of matching potential selectors to potential selectees may also be understood.

As discussed briefly, the U.S. federal government, as well as many other governments, has a stated policy objective of seeking transparency in its contracting process. As such, a significant quantity of data related to the contracting process is publicly available, and can be accessed and aggregated by the public. As such, a significant amount of data can be retrieved for use in a AFMCA or other such process, such as may be used by a vendor matching engine.

According to an exemplary embodiment, a vendor matching engine may, generally, perform a process similar to the following. The vendor matching engine may first acquire data on the federal contracting process or the relevant aspects thereof from one or more services.

For example, according to an exemplary embodiment, the vendor matching engine may perform acquisition of data 106 from the Federal Procurement Data System (FPDS) 102, a system managed by the Federal Procurement Data Center (FPDC) of the General Services Administration (GSA), and which is provided in order to be a single source for government-wide procurement data. This system may contain detailed information on all contract actions over $3000 since fiscal year 2004, providing detailed information on who bought what, from whom, for how much, when and where.

In another exemplary embodiment, the vendor matching engine may perform acquisition of data 106 from the System for Award Management (SAM) e-procurement system 104 or from any other e-procurement or data system which is included in the SAM system. The SAM system may, for example, include the FPDS, as well as a significant number of other systems, such as eSRS/FSRS (the Electronic Subcontracting Reporting System/FFATA Sub-Award Reporting System) or FBO (the Federal Business Opportunities system). SAM data 104 may also be used to corroborate data from FPDS 102; for example, it may be desired to search the Central Contractor Registration system (CCR) in order to determine whether particular contractors have been recorded as small or large corporations, and so on.

In another exemplary embodiment, the vendor matching engine may supplement or replace government data (such as FPDS data 102 and SAM data 104, or different data for any other government) with any other data that may be collected from any other source, including, for example, internal records. For example, it may be determined that the FPDS is insufficiently reliable for the intended purpose, owing to certain observed shortcomings of the FPDS, such as inaccuracy in its records. (For example, subsidiaries and predecessor companies of large businesses are often listed in the database as small businesses, contracts to large companies are often recorded as contracts to small businesses, and government set-aside grants are often recorded as having gone to large corporations, leading to possible reliability issues in development of a profile for a desired contractor firm. For instance, the profile may indicate that a desired contractor firm for a particular government agency may be a smaller-sized business or a larger-sized business than would be accurate.) As such, the FPDS data may be corroborated with other data, such as publicly-available market cap information or other information on business size, which may correct certain inaccuracies in the FPDS records. In another example, it may be determined that FPDS data is not sufficiently up to date or that new FPDS data is not sufficiently reliable, as FPDS data is constantly being modified. (For example, in FY2008, it appears that over $100 billion worth of entries to the FPDS system were modified, representing almost half of the information in the database.) As such, more recent FPDS data may be removed, or may be corroborated with other data. Other modifications to the data may be understood and may be made as desired.

According to an exemplary embodiment, once data has been acquired, the vendor matching engine may clean up the selected data 108 and normalize it for use in the remainder of the process. For example, the engine may perform discretization of any continuous variables that may be derived from the data, and may standardize variable values. Once the variables have been discretized and standardized (or, for example, concurrently with this process), any missing variable values may be identified and may be imputed based on logical rules. The vendor matching engine may then add these missing variable values to the set of selected variables.

The vendor matching engine may then move onto a variable selection process 110. in order to select one or more attributes that best describe the various entities that may be identified in the initial data set. (For example, according to an exemplary embodiment in which historical award information is retrieved from a government award repository such as FPDS, entities that may be selected and extracted through a variable selection step may be, for example, contracts, agencies, and vendors, where agencies have granted contracts to vendors.) This may allow each entity to be described by a set of one or more attributes. According to an exemplary embodiment, in a variable selection step, a vendor matching engine may select a plurality of selected variables from the plurality of initial variables based on the completeness, imputability, and lack of redundancy of the selected variables; in order to do this, the vendor matching engine may identify which variables are incomplete, resistant to imputation, or which are redundant, and may reject those variables.

Other variations of such initial processing steps may be understood. For example, turning briefly to exemplary FIG. 2, it may be desirable to perform a cleaning step 210 after a variable selection step 208, or concurrently or semi-concurrently, such as may be desired. Other variations of step order may also be understood.

Once any missing variables have been filled in, the vendor matching engine may then collect the selected variables in one or more categories, such as, for example, a plurality of variables containing information about the selectee or vendor (selectee variables 112) or a plurality of variables containing information about the selector or selection process, such as the government agency (selection variables 114). These selected variables may then be aggregated in a selection aggregation step 116.

In a next step 118, the data may be properly structured prior to application of an AFMCA algorithm or other algorithm. In order to properly structure the data, according to an exemplary embodiment, one or more observational units of interest having unique levels may be defined, and the unique levels of each observational unit of interest may be identified. For example, according to an exemplary embodiment of a data set, each nominal variable (excluding ID variables, each of which may serve as an observational unit of interest) set may include several levels, with each level being coded as a binary variable.

In a next step 120, the data may be transformed based on the observations identified in the previous step. This may be, for example, a dummification step, in which the selected variables (which may exclude ID variables) may be dummified in order to convert them into binary variables. (For example, each original variable in the table that had been obtained in previous steps may be replaced with one or more new variables, the new variable(s) corresponding to a level of the original variable and being provided in a binary form.) According to an exemplary embodiment, each level of any of the ID variables may thus become its own observational unit of interest, which may result in a matrix made up of binary data that may represent the allocation of the values of remaining variables across their respective levels.

To illustrate how the definition of levels 118 and the dummification of non-ID variables within those levels 120 may be performed, an example of a leveling step 118 and a dummification step 120 may be provided. For example, according to an exemplary embodiment, one of the variables that is initially retrieved may be a variable such as "vendorcountrycode," which may specify a country in which a vendor is incorporated. Vendors in a particular data set may be incorporated in, for example, 22 different countries, including the USA and 21 foreign countries. As such, this particular variable may contribute 22 columns to the eventual indicator matrix generated as part of the remaining steps (such as a dummification step). For example, once the levels are defined in a level generation step 118, a vendor that is incorporated in the United States may be assigned a 0 in 21 of the 22 columns, with these 21 columns corresponding to the options for "vendorcountrycode" other than "vendorcountrycode_USA." The vendor may then be assigned a 1 in the remaining column corresponding to "vendorcountrycode_USA."

Tables 1 and 2, below, show an exemplary data set before and after the definition of levels and a dummification step. Specifically, Table 1 may show a portion of the exemplary data set as it originally appears, while Table 2 may show a portion of the exemplary data set after it has been converted to an indicator matrix form in a leveling step 118 and dummified in a dummification step 120. According to an exemplary embodiment, the number of columns of the data set may be significantly expanded following a dummification step 120, with the columns displayed in Table 2 being only a small election thereof.

TABLE 1

Exemplary data set as it originally appears.

| contractingofficeagencyid | contractingofficeid | vendorname | idvpiid |
|---|---|---|---|
| 7008: U.S. COAST GUARD | 00040: SFLC PROCUREMENT BRANCH 3 | RIVER DIVING & SALVAGE, INC. | HSCG8515PP45W99 |
| 7003: U.S. CITIZENSHIP AND IMMIGRATION SERVICES | ERBUR: USCIS CONTRACTING OFFICE | SAFEGUARD DOCUMENT DESTRUCTION INC. | GS03F065BA |

TABLE 1-continued

Exemplary data set as it originally appears.

| contractingofficeagencyid | contractingofficeid | vendorname | idvpiid |
|---|---|---|---|
| 7003: U.S. CITIZENSHIP AND IMMIGRATION SERVICES | ERBUR: USCIS CONTRACTING OFFICE | TROTTER FLOOR CLEANING SERVICE INC. | HSSCCG16P00003 |
| 7003: U.S. CITIZENSHIP AND IMMIGRATION SERVICES | ERBUR: USCIS CONTRACTING OFFICE | ELECTRONIC RISKS CONSULTANTS INC. | HSSCCG16POOIO |
| 7008: U.S. COAST GUARD | 00031: BASE ALAMEDA | PAPE MACHINERY INC | HSCG31I5PPAN196 |
| 7003: U.S. CITIZENSHIP AND IMMIGRATION SERVICES | ERBUR: USCIS CONTRACTING OFFICE | AK SOLID STATE INC | HSSCCGl2P00076 |
| 7003: U.S. CITIZENSHIP AND IMMIGRATION SERVICES | ERBUR: USCIS CONTRACTING OFFICE | REED ELSEVIER, INC. | LC14C7121 |

TABLE 2

Exemplary data set following dummification.

| contractingofficeagencyid | vendorcountrycode_ABW | vendorcountrycode_ARE | vendorcountrycode_AUS |
|---|---|---|---|
| 7008: U.S. COAST GUARD | 0 | 0 | 0 |
| 7003: U.S. CITIZENSHIP AND IMMIGRATION SERVICES | 0 | 0 | 0 |
| 7003: U.S. CITIZENSHIP AND IMMIGRATION SERVICES | 0 | 0 | 0 |
| 7003: U.S. CITIZENSHIP AND IMMIGRATION SERVICES | 0 | 0 | 0 |
| 7008: U.S. COAST GUARD | 0 | 0 | 0 |
| 7003: U.S. CITIZENSHIP AND IMMIGRATION SERVICES | 0 | 0 | 0 |
| 7003: U.S. CITIZENSHIP AND IMMIGRATION SERVICES | 0 | 0 | 0 |

Once the dummified data 120 has been assembled, the system may perform an AFMCA process, which may be shown in the lower part of FIG. 1. According to an exemplary embodiment, the system may proceed along two tracks, a first track beginning with a selector aggregation process 122 and which may in some exemplary embodiments make use of, for example, historical award data (such as FPDS data), and a second track beginning with a selectee aggregation process 132 and which may in some exemplary embodiments make use of, for example, registry information or other selectee data (such as SAM data) as well as historical award data. (Other arrangements of aggregating data may also be understood and may be implemented as desired.) According to an exemplary embodiment, the two tracks may be performed simultaneously or one after the other, such as may be desired.

Looking at the steps disposed along a first track, the vendor matching engine may take steps to calculate coordinates for the selecting or awarding party (such as the government entity) in a coordinate space 130. The step of calculating selector coordinates in the coordinate space 130 may require or may include aggregating the selector data 122 into a selector profile dataset by aggregating the dummified variables that had been previously selected in a variable selection step; this aggregation may be done by, for example, agency ID or other selector ID, or may be done through another process such as may be desired. The step of calculating selector coordinates 130 may further include transforming the selector profile dataset into a matrix of proportions 124, which may involve computing a plurality of fuzzy variables for the selector. A matrix of inertias 126 may then be generated based on the matrix of proportions generated in the previous step 124. This matrix of inertias may then be decomposed 128, using Generalized Single Value Decomposition, into a set of coordinates 130, which may then be used to create the selector AFMCA coordinate space which may be used to compare data points.

Looking at the steps disposed along a second track, the vendor matching engine may perform similar calculations for the selectee or award receiving party (such as a vendor contracted by a government entity) in order to project it onto the same coordinate space. The step of calculating selectee coordinates in the coordinate space may include aggregating the selectee data into a selectee profile dataset by aggregating the dummified non-ID variables that had been previously selected in a variable selection step 132; this aggregation may be done by, for example, vendor ID or other selectee ID, or may be done through another process such as may be desired.

The step of calculating selectee coordinates may further include transforming the selectee profile dataset into a matrix of proportions 134, and then generating a matrix of inertias 136 based on the matrix of proportions. Once this table of inertias has been generated, it may be projected into the selector AFMCA coordinate space that had been previously obtained using Generalized Single Value Decomposition, using matrix multiplication 138.

According to an exemplary embodiment, a matrix of inertias, such as matrix of inertias 126, 136, may store a set of statistical inertias, which may be measures of surprise or discrepancies between observations and expectations. As discussed briefly above, this measure may be closely related to the Chi-Squared statistic. Statistical inertias may be calculated based on the following equation:

$$s_{i,j} = \frac{(p_{i,j} - r_i c_j)}{\sqrt{r_i c_j}}$$

In such an equation, the statistical inertia $s_{i,j}$ may be calculated based on a set of relative frequencies $p_{i,j}$ for a table of observations, which may in turn be calculated such that $$p_{i,j} = \frac{n_{ij}}{n},$$

wherein for a row index i and column index j of the table of observations, $n_{i,j}$ is the observation data value at a particular value of the row index i and column index j, and n is the grand sum of all of the data values.

Expanding on this further, $r_i$ may be a row sum of all of the data having a particular row index i, and $c_j$ may be a column sum of all of the data having a particular column index j. These values may be the marginal frequencies.

The product of these values, $r_i c_j$, is provided based on an assumptive or null hypothesis of independence between the units of observation represented by the rows (which in this case may be selector parties, such as government agencies) and those units of observation represented by the columns (which in this case may specifically correspond to the several attributes that describe either the organizational characteristics of the vendors to whom those agencies awarded contracts, or the contracting characteristics of the awarded contracts); if the values are independent, then the product $r_i c_j$ must equal the relative frequencies $p_{i,j}$.

As such, the individual statistical inertias $s_{i,j}$ for each set of row index i and column index j values that may be associated with each observation $n_{i,j}$ may be measurements of the degree to which this assumption of independence may be defied; a large difference between the two values may indicate that there is more significant defiance of this assumption, and thus may provide an indication of biased selection behaviors. (As such, the degree of alignment between a particular selector and a particular selectee may be a strong indicator of the potential that the selectee has to be selected by the selector; for example, the degree of alignment between the attributes of a particular vendor and the particular bias in selection behavior of a particular government agency may provide an indication of the potential or lack of potential that the vendor has for being considered among the pool of vendors that may be awarded contracts by that particular government agency.)

As such, once inertias are calculated, the vendor matching engine may then continue processing by calculating distances in the vendor space, in a distance calculation step 140. In an exemplary embodiment, this may be performed by first calculating a set of coordinates for each government entity and for each vendor, and then determining the distances between each relevant set of coordinates. The vendor matching engine may then calculate a plurality of Euclidean distances between each pairwise combination of a selector or awarding party coordinate pair in the coordinate space and a selectee or applicant coordinate pair in the coordinate space. According to an exemplary embodiment, the vendor matching engine may organize this information in a table of vendor distances.

According to an exemplary embodiment, all distances have been calculated in a distance calculation step 140, the vendor matching engine may then generate selectee scores based on the distances, in a scoring step 142. In an exemplary embodiment, the scores generated through a scoring step 142 may be a quantitative score describing a degree of similarity that the selectee has with the selector, such that, for example, the higher the score a selectee has with a particular selector (such as, for example, with a particular agency or department), the higher the level of compatibility that exists between the selectee and the selector (for example, between a vendor and the corresponding government agency, department, or other entity).

In other exemplary embodiments, other scores for one or more other applicants may be generated. Scores may then be retrieved and subsequently displayed to members of a subscription base through an applicable technological delivery system, which may, for example, control which scores or which information may be accessible to which members as discussed previously.

According to an exemplary embodiment, selectee scores may be based directly on selector distances or may be based on a minor or major alteration thereof. For example, in an exemplary embodiment, the table of selector distances may be processed for output; for example, a table of selector distances generated in a distance step 140 may be subjected to a rank transformation by the vendor matching engine, resulting in a table of selector scores provided in a ranked order. In an exemplary embodiment, one or more transformations may be executed on this scoring data (for example, it may be desirable for the vendor matching engine to perform a normalization step so as to provide scores between 0 and 100) and the data may then be output 146.

In an exemplary embodiment, data that is output may be provided directly to the vendors 146, or may be subject to additional processing steps. For example, in an exemplary embodiment, each vendor (or each vendor that has submitted a request) may be provided with a subset of a table showing the vendor scores which includes at least the score of the vendor with respect to each government entity. (In some exemplary embodiments, it may also be desirable to additionally or alternatively provide scoring information to the government entity in order to facilitate a selection of a vendor, for example if the government entity wishes to obtain a list of potential candidates for a no-bid contract.) In another example, based on these scores, the vendor matching engine may generate at least one recommendation tailored to the prospective applicant, such as whether the prospective applicant should or should not draft a particular application, or which applications may be highest-priority. In some exemplary embodiments, this may be coupled with other data, such as, for example, a monetary value of an award (or any other measure of the subjective value, from the perspective of any of the selectees, of being selected by a particular selector) as well as a likelihood of being awarded the contract or grant (or any of the other possible forms of selections that selectors may perform among eligible selectees) or other information that may be based on a distance between selector and selectee. (Note that in some exemplary embodiments, the value of the award or other measures of subjective value may vary from selectee to selectee; for example, in an exemplary embodiment where an award is a scholarship, a first student may meet a first set of conditions to receive a first amount under the scholarship and a second student may meet a second set of conditions to receive a second amount under the scholarship. In an exemplary embodiment, this may be taken into account.)

According to an exemplary embodiment, it may also be desirable to incorporate selectors or selectees that were not in the original calculations, in order to obtain scores for those selectors or selectees (such as, for example, new vendors or government entities). For example, a particular vendor may be found not to have contracted with a particular government entity, and as such it may be desired to calculate a score based on the vendor's known attributes. A vendor matching engine may be configured to calculate a score based on any of the vendor's known attributes that can be determined, and, if an attribute cannot be determined, may be configured to substitute other information (such as the attributes of another vendor) or may be configured to generate one or more estimates of those attributes, such as may be desired.

For example, according to an exemplary embodiment, a vendor may be registered as a federal contractor, and may have contracted with one or more government entities in the past, but may not have contracted with a particular government entity. According to an exemplary embodiment, the distance of the vendor to a government entity in question may be calculated based on following the process for generating a matchability score 100 while skipping or substituting one or more steps. For example, according to an exemplary embodiment, the steps for such a vendor may be the same in the initial stages; for example, the vendor may still have vendor registration information in the System for Award Management (SAM), and as such data that can be retrieved from this system (such as, for example, a country of incorporation of the vendor) may still be retrieved. However, certain steps may be left out; for example, if certain data is absent, leveling 118 and dummification 120 of this data may not be performed, or certain default values may be assigned as desired. (This may likewise be the case for other selector-selectee pairs, such as students and educational institutions.)

According to an exemplary embodiment, once this information has been calculated and the information of a vendor not in the original vendor space has been added, the system may perform recalculation of vendor scores 142. For example, according to an exemplary embodiment where a vendor score is scored out of 100 based on the highest vendor score, the recalculation may be based on the new lowest vendor distance (or highest vendor proximity), with the scores being renormalized or otherwise recalculated based on this new lowest vendor distance.

According to other exemplary embodiments, other methods of calculating score information 142 for selectors or selectees may also be available. For example, according to an exemplary embodiment where a selectee is a vendor intending to contract with a government agency, instead of calculating an estimated score based on a vendor's known attributes and estimated attributes substituted for the vendor's unknown attributes, an estimated vendor score may be calculated based on the vendor's similarity to other vendors that have contracted with the government agency in question. For example, if the vendor is a small business operating in a particular jurisdiction and having a particular employee makeup, the vendor may be likened to any similarly-situated small businesses, if any were in the original vendor space calculations or otherwise have past history with the government entity.

In some exemplary embodiments, vendor score calculations may be used for other business intelligence purposes or other purposes as well. For example, it may be desirable to indicate to vendors when their company has a very low distance in AFMCA space between their company and the government entity (or when their company has a higher distance from the government entity in AFMCA space). However, it may also be desirable to indicate to the vendor when many other companies also have a low distance in AFMCA space between their company and the government entity (indicating that there may be many probable competitors) or when few other companies have a low distance (indicating that there may be few probable competitors). In an exemplary embodiment, such information may be included in a calculation of the matchability score, if desired. (This and other functions may likewise be performed for any other combination of selectors and selectees, as desired.)

According to an exemplary embodiment, such a vendor matching engine may provide a quantitative measurement of the degree of compatibility that a given vendor or other grant receiving organization may possess with the government entity that is in charge of awarding the contract or otherwise providing the award. This may ensure that the vendor can prioritize government contracts that they may be highly compatible with, and does not need to waste time analyzing requests for proposals from government entities that they are not likely to be compatible with.

Figure 2:
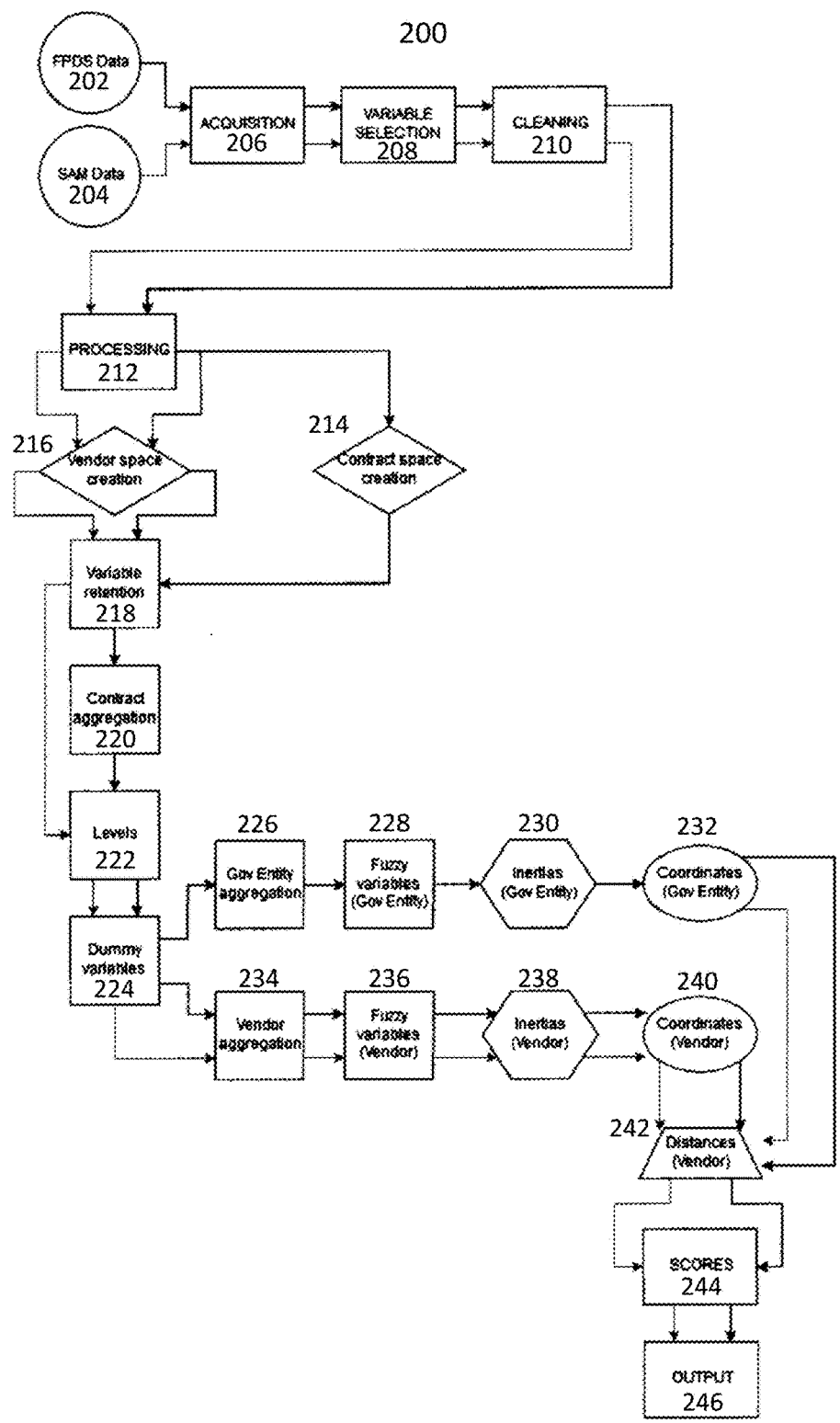
FIG. 2 is an exemplary flowchart depicting an exemplary embodiment of a process of generating a matchability score using a vendor matching engine.

Some examples and variants of this process may be provided in the following figures. Turning now to exemplary FIG. 2, FIG. 2 shows an exemplary embodiment of one potential variant AFMCA process 200 that may be performed by a vendor matching engine.

According to an exemplary embodiment, in a variant AFMCA process 200, a vendor matching engine may retrieve data from similar sources, such as FPDS data 202 and SAM data 204, in a data acquisition step 206. As previously discussed, according to an exemplary embodiment, a variable selection step 208 and a cleaning step 210 may be performed in an opposite order as compared to what is depicted in FIG. 1, if desired.

According to an exemplary embodiment, once all data has been collected and cleaned 210, the vendor matching engine may proceed to a processing step 212. In an exemplary embodiment, in a first stage of a processing step 212, the vendor matching engine may be configured to create a coordinate space 216, 214, which may make use of any selectee data, such as, for example, vendor data 216, or alternatively vendor transactional data/contract data 214. (In an exemplary embodiment, similar information may be retrieved from the vendor data 216 and the contract data 214, or the retrieval steps may be combined in some form, if desired. For example, it may be desired to use contract data for those vendors having contract data, and may be desired to use vendor data for those vendors not having contract data.) This process may take several steps.

In a first step of the processing phase 212 of the variant process, a variable retention process 218 may be performed.

In a variable retention process 218, certain variables may be eliminated from those selected during a variable selection 208 and cleaning 210 process. For example, according to an exemplary embodiment, only "vendor information" or "contract information" can be selected, if it is desired to use one or the other.

In some exemplary embodiments, this process or another process may make use of "vendor information," "contract information," or both, such as may be desired. Vendor information may be information describing the characteristics of the selector, while contract information may be information describing the characteristics of the transaction; other information, such as ID variables, may also be present in the data set. Example ID variables may include, for example, contractingofficeagencyid (the ID of the contracting office agency), contractingofficeid (the ID of the contracting office itself), vendorname (the name of the vendor or selectee), and idvpiid (the Indefinite Delivery Vehicle (IDV) Procurement Instrument Identifier (PHD) number for the transaction).

Example "vendor" or "organizational" variables may include, for example, vendorcountrycode, vendor_state_code, manufacturingorganizationtype, organizationaltype, numberofemployees, annualrevenue, firm8aflag, hubzoneflag, sdbflag, issbacertifiedsmalldisadvantagedbusiness, shelteredworkshopflag, hbcuflag, educationalinstitutionflag, womenownedflag, veteranownedflag, srdvobflag, localgovernmentflag, minorityinstitutionflag, aiobflag, stategovernmentflag, federalgovernmentflag, minorityownedbusinessflag, apaobflag, tribalgovernmentflag, baobflag, naobflag, saaobflag, nonprofitorganizationflag, isothernotforprofitorganization, isforprofitorganization, isfoundation, haobflag, ishispanicservicinginstitution, emergingsmallbusinessflag, hospitalflag, contractingofficerbusinesssizedetermination, is1862landgrantcollege, is1890landgrantcollege, is1994landgrantcollege, isveterinarycollege, isveterinaryhospital, isprivateuniversityorcollege, isschoolofforestry, isstatecontrolledinstitutionofhigherlearning, receivescontracts, receivesgrants, receivescontractsandgrants, isairportauthority, iscouncilofgovernmentsl. Ishousingauthoritiespublicortribal, isinterstateentity, isplanningcommis sion, isportauthority, istransitauthority, issubchapterscorporation, islimitedliabilitycorporation, isforeignownedandlocated, isarchitectureandengineering, isdotcertifieddisadvantagedbusinessenterprise, iscitylocalgovernment, iscommunitydevelopedcorporationownedfirm, iscommunitydevelopmentcorporation, isconstructionfirm, ismanufacturerofgoods, iscorporateentitynottaxexempt, iscountylocalgovernment, isdomesticshelter, isfederalgovernmentagency, isfederallyfundedresearchanddevelopmentcorp, isforeigngovernment, isindiantribe, isintermunicipallocalgovernment, isinternationalorganization, islaborsurplusareafirm, islocalgovernmentowned, ismunicipalitylocalgovernment, isnativehawaiianownedorganizationorfirm, isotherbusinessororganization, isotherminorityowned, ispartnershiporlimitedliabilitypartnership, isschooldistrictlocalgovernment, issmallagriculturalcooperative, issoleproprietorship, istownshiplocalgovernment, istriballyownedfirm, istribalcollege, isalaskannativeownedcorporationorfirm, iscorporateentitytaxexempt, iswomenownedsmallbusiness, isecondisadvwomenownedsmallbusiness, isjointventurewomenownedsmallbusiness, isjointventureecondisadvwomenownedsmallbusiness, or principal_naics_code, which may describe particular vendor attributes that may be readily understood from the variable. (For example, "isjointventurewomenownedsmallbusiness" may be a flag indicating whether the vendor or selectee is a joint venture with a women-owned small business.)

Example contractual variables or variables describing the relationship between selector and selectee may include, for example, baseandalloptionsvalue, dollarsobligated, fundedbyforeignentity, signeddate, contractactiontype, typeofcontractpricing, subcontractplan, multiyearcontract, performancebasedservicecontract, contingencyhumanitarianpeacekeepingoperation, contractfinancing, purchasecardaspaymentmethod, nationalinterestactioncode, pop_state_code, placeofperformancecountrycode, psc_cat, gfe_gfp, useofepadesignatedproducts, recoveredmaterialclauses, contractbundling, countryoforigin, placeofmanufacture, extentcompeted, reasonnotcompeted, numberofoffersreceived, commercialitemacquisitionprocedures, commercialitemtestprogram, a76action, solicitationprocedures, typeofsetaside, localareasetaside, evaluatedpreference, fedbizopps, statutoryexceptiontofairopportunity, or clingercohenact, which may describe particular attributes pertaining to the contractual relationship or other relationship between the selector and selectee. (For example, "baseandalloptionsvalue" may refer to a dollar value of the contract.)

Information on these or other variables may be available through the appropriate government contracting authority, such as the GSA Data Dictionary. Other information, or a selection of this information (such as just vendor data, just contract data, or some combination of both) may be employed such as is desired; for example, when the selectors and selectees are entities other than vendors and government agencies (such as, for example, students and educational institutions) other selector and selectee data may be used such as may be desired.

The selected data may then be aggregated 220, one or more levels may be defined 222, and a dummification step may then be executed on the data 224, which may proceed essentially as described with respect to FIG. 1. The vendor matching engine may then proceed through each of the two tracks described in FIG. 1, specifically a selector track beginning with a selector aggregation process 226 and which may in some exemplary embodiments make use of, for example, historical award data (such as FPDS data), and a second track beginning with a selectee aggregation process 234 and which may in some exemplary embodiments make use of, for example, registry information or other selectee data (such as SAM data) as well as historical award data. For example, in a first track, the vendor matching engine may perform a step of computing a plurality of fuzzy variables 228, generating a matrix of inertias 230, and generating a plurality of coordinates 232. In a second track, the vendor matching engine may perform a step of computing a plurality of fuzzy variables 236, generating a matrix of inertias 238, and generating a plurality of coordinates 240 by some method (such as matrix multiplication). Distances 242 and scores 244 may then be computed and output 246.

Figure 3A:
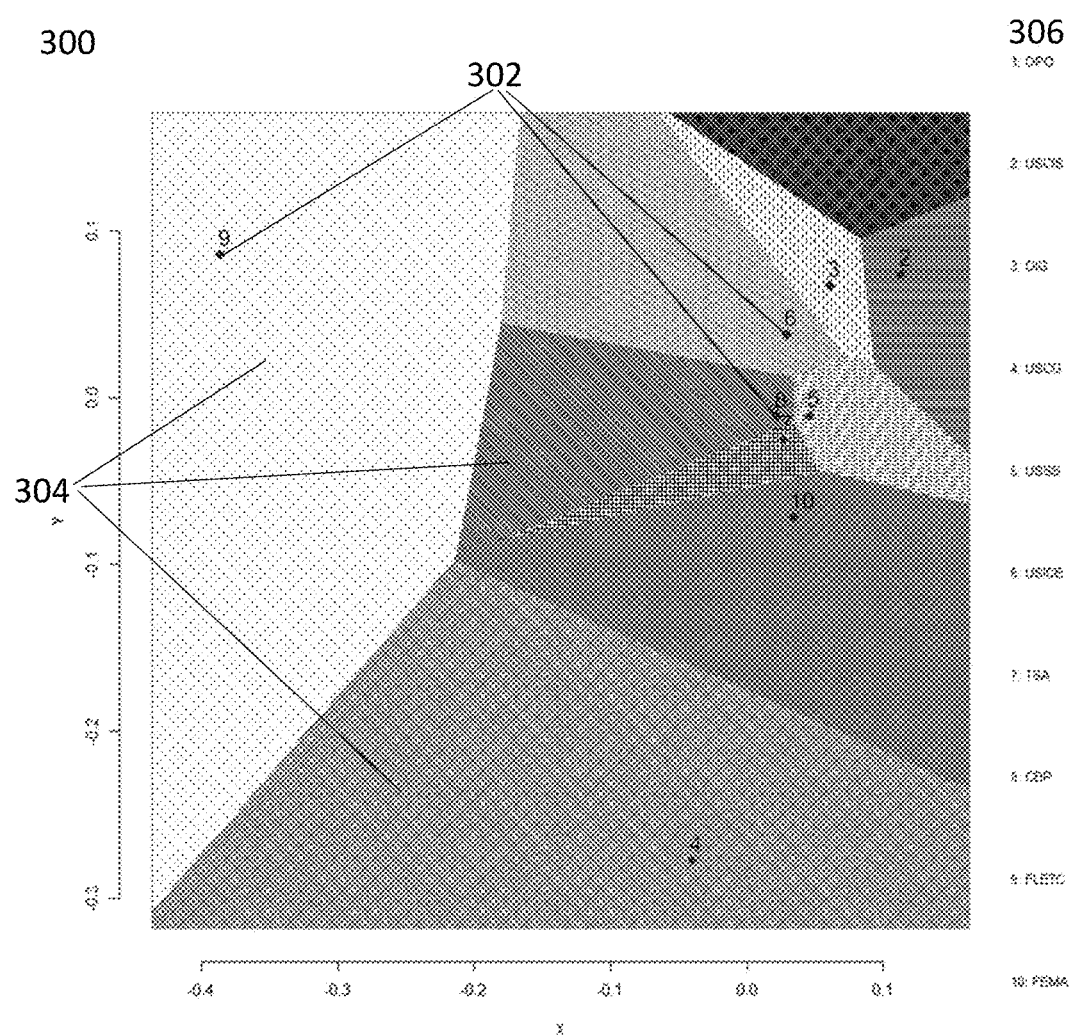
FIG. 3A is an exemplary embodiment of a solution space created in terms of one or more agencies undergoing analysis, for a specific year.

Turning now to exemplary FIG. 3A, FIG. 3A may display an exemplary embodiment of an exemplary two-dimensional solution space 300 created in terms of one or more agencies undergoing analysis, for a specific year. The solution space 300 may include one or more points 302, each point corresponding to a particular agency or selector, and which may be plotted in terms of its vendor or selectee attributes. The solution space 300 may further include a plurality of agency spaces 304, shown in this case as Voronoi tessellations. As shown in exemplary FIG. 3A, Voronoi tessellations may be formed from the collection of all points in a particular space for which a particular point in a set of points which has a specific location in this space is closer than all other particular points from among a set of points having specific locations in this space. As such, according to an exemplary embodiment, each agency space 304 may be defined based on a selection of points that are closer to a particular agency point 302 than to any other agency, which may represent a space in which a vendor having those attributes is best served by pursuing contracts with that agency. A key 306 may further be shown indicating which points 302 and/or agency spaces 304 correspond to which agency; for example, according to an exemplary embodiment, point #1 may be OPO (the DHS Office of Procurement Operations), point #2 may be the USCIS (Citizenship and Immigration Services), point #3 may be the OIG (Office of the Inspector General), point #4 may be the USCG (US Coast Guard), point #5 may be the USSS (Secret Service), point #6 may be the USICE (Immigration & Customs Enforcement), point #7 may be the TSA (Transportation Security Administration), point #8 may be CBP (Customs & Border Protection), point #9 may be FLETC (the Federal Law Enforcement Training Center), and point #10 may be FEMA (the Federal Emergency Management Agency).

Figure 3B:
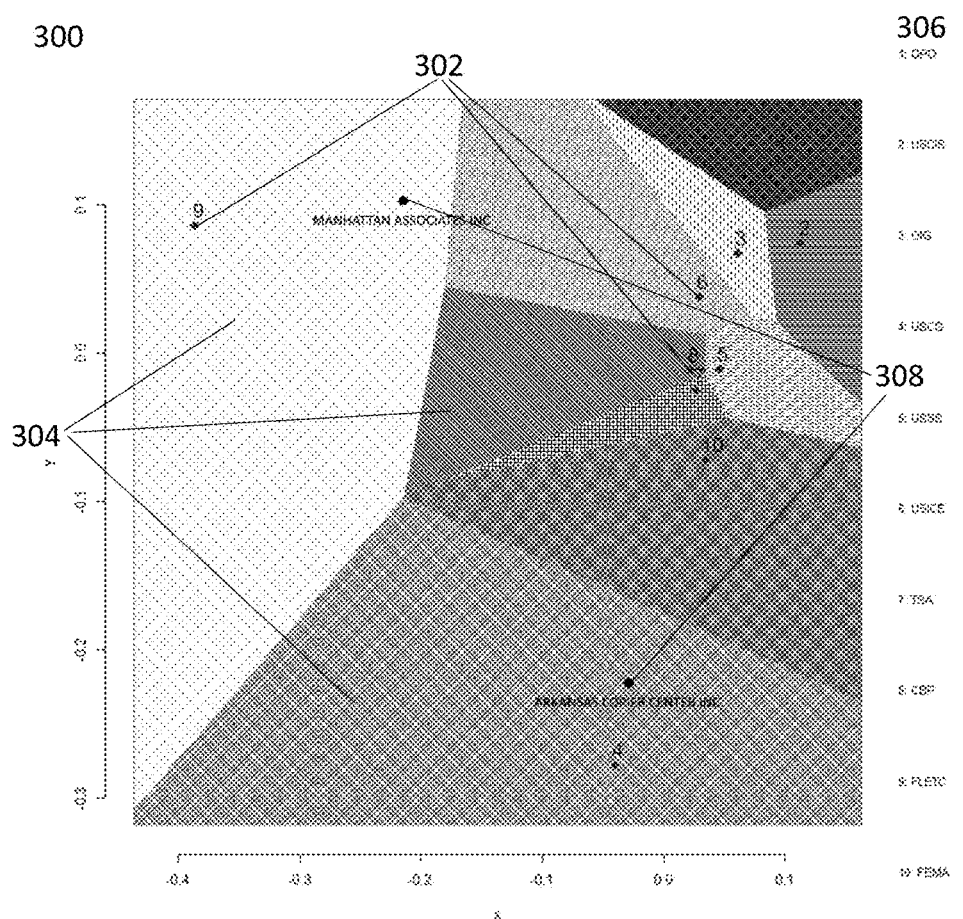
FIG. 3B is an exemplary embodiment of a solution space created in terms of one or more agencies undergoing analysis, for a specific year, in this case showing several vendors within the solution space.

Turning now to exemplary FIG. 3B, FIG. 3B is an exemplary embodiment of a solution space 300 created in terms of one or more agencies undergoing analysis, for a specific year, in this case showing several vendors 306 within the solution space. In particular, the vendors "MANHATTAN ASSOCIATES INC" and "ARKANSAS COPIER CENTER INC" have been added, though it may be understood that many other vendors 306 may likewise be added, such as may be desired.

In the exemplary embodiment shown in FIG. 3B, the vendor 306 "ARKANSAS COPIER CENTER INC" may be closest to the point 302 numbered "4," and may fall into the agency space 304 of this point. This may indicate that, based on the past history of "ARKANSAS COPIER CENTER INC," this vendor 306 may be closest to the government agency corresponding to this point 302, and that it may thus be most valuable for the vendor 306 to concentrate their efforts on this government agency. It can be seen from the key that this point 302 and this agency space 304 corresponds to the US Coast Guard, and as such a recommendation may be prepared for ARKANSAS COPIER CENTER INC to pursue contracts from the US Coast Guard further.

Figure 3C:
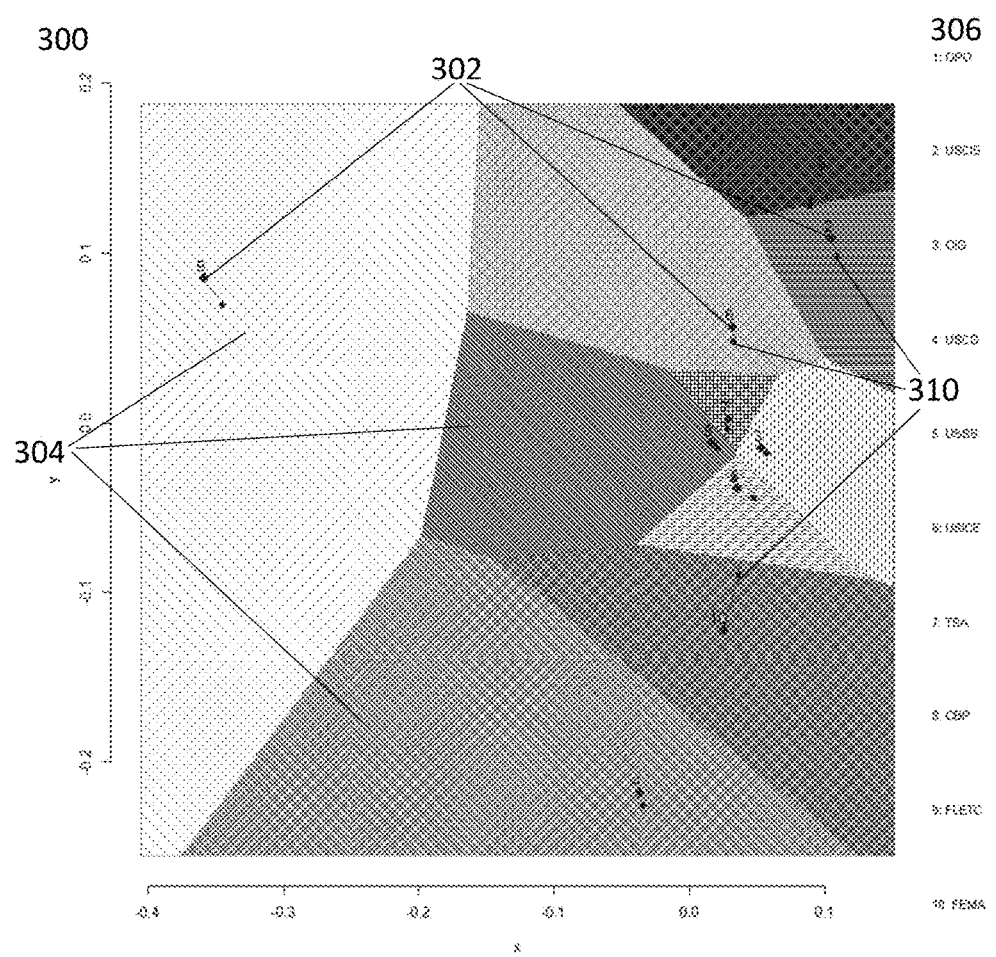
FIG. 3C is an exemplary embodiment of a solution space created in terms of one or more agencies undergoing analysis, for a previous year.

Turning now to exemplary FIG. 3C, the shifts of each selectee or each selector may also be tracked over time. For example, according to an exemplary embodiment, a plot may be generated having points in the positions that particular agencies have in a current year 302 and in a previous year 310. The agency space 304 corresponding to each agency may likewise shift. This may provide an indication of how consistent each agency is from year to year; some agencies (such as point #10, FEMA) may be less consistent than others (or may be more consistent than others) and as such may be more or less valuable to pursue, depending on the needs of the selectee.

Figure 4A:
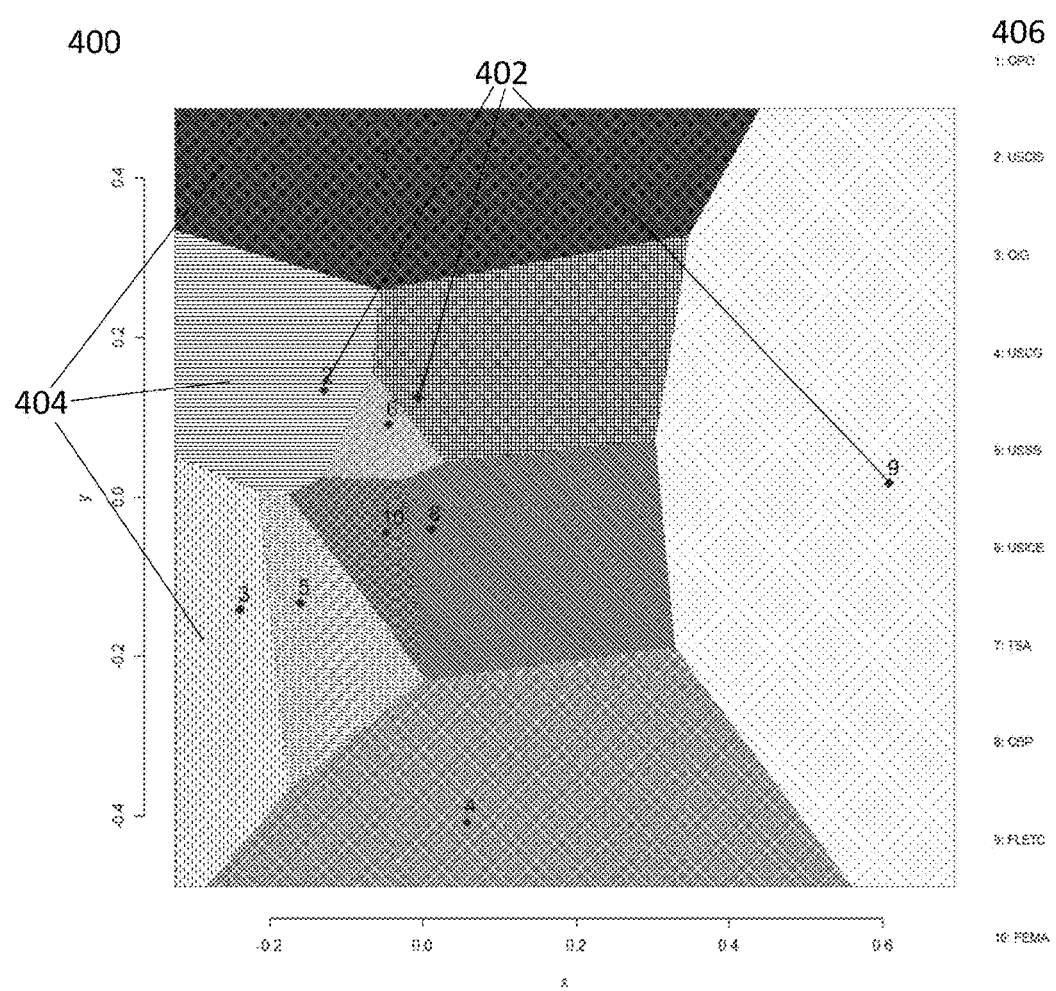
FIG. 4A is an exemplary embodiment of a solution space created in terms of one or more agencies undergoing analysis, for a specific year.

Turning now to exemplary FIG. 4A, FIG. 4A may show an exemplary embodiment of a solution space 400 created in terms of one or more agencies undergoing analysis, for a specific year. In contrast to the solution space 300 shown in FIGS. 3A to 3C, which may be based on vendor or other selectee data, the solution space 400 shown in FIGS. 4A through 4C may be based on contract or other transactional data. As in exemplary FIGS. 3A to 3C, a plurality of points 402 and a plurality of agency spaces 404 may be shown, along with a key 406. As noted, because the solution space 400 shown in FIGS. 4A through 4C may be based on contract or other transactional data rather than vendor or other selectee data, it may have some differences as compared to the solution space 300 of FIGS. 3A to 3C.

Figure 4B:
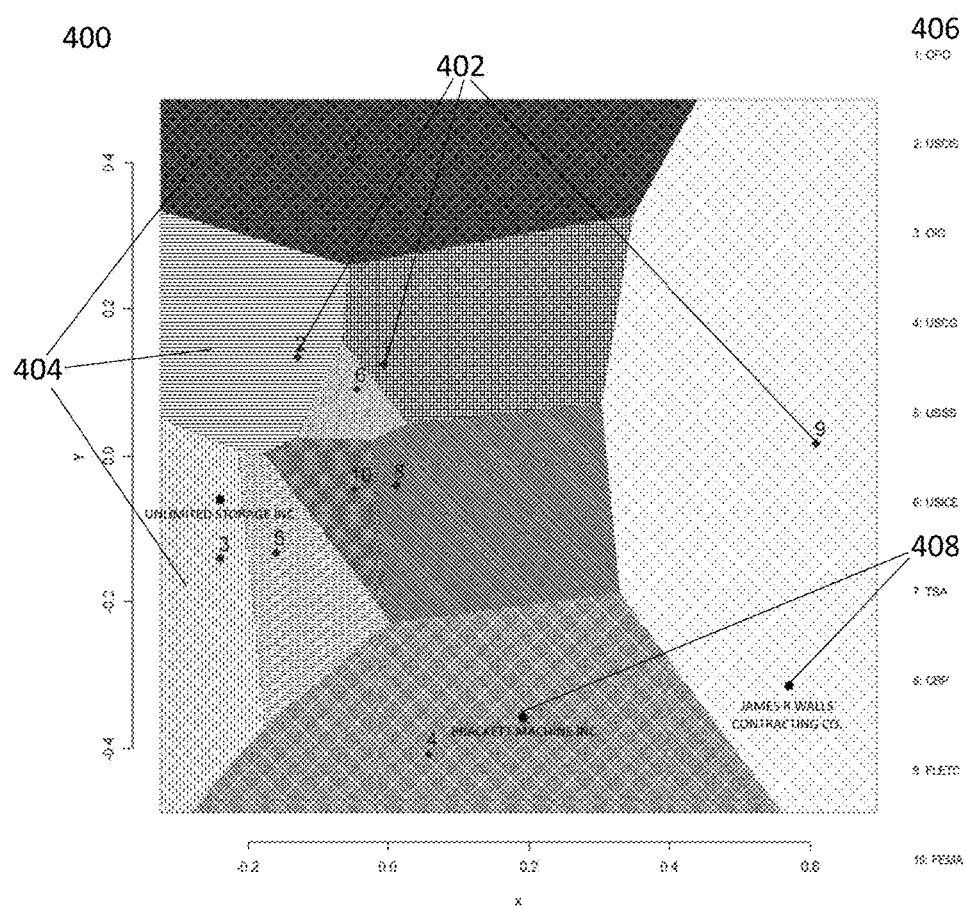
FIG. 4B is an exemplary embodiment of a solution space created in terms of one or more agencies undergoing analysis, for a specific year, in this case showing several vendors within the solution space.

Turning to exemplary FIG. 4B, FIG. 4B may show an exemplary embodiment of a solution space 400 created in terms of one or more agencies undergoing analysis, for a specific year, in this case showing several vendors 408 within the solution space. In particular, vendors 408 such as BRACKETT MACHINE INC and JAMES R WALLS CONTRACTING CO may be provided, and may in this case appear in the agency space of the FLETC and the Coast Guard.

Figure 4C:
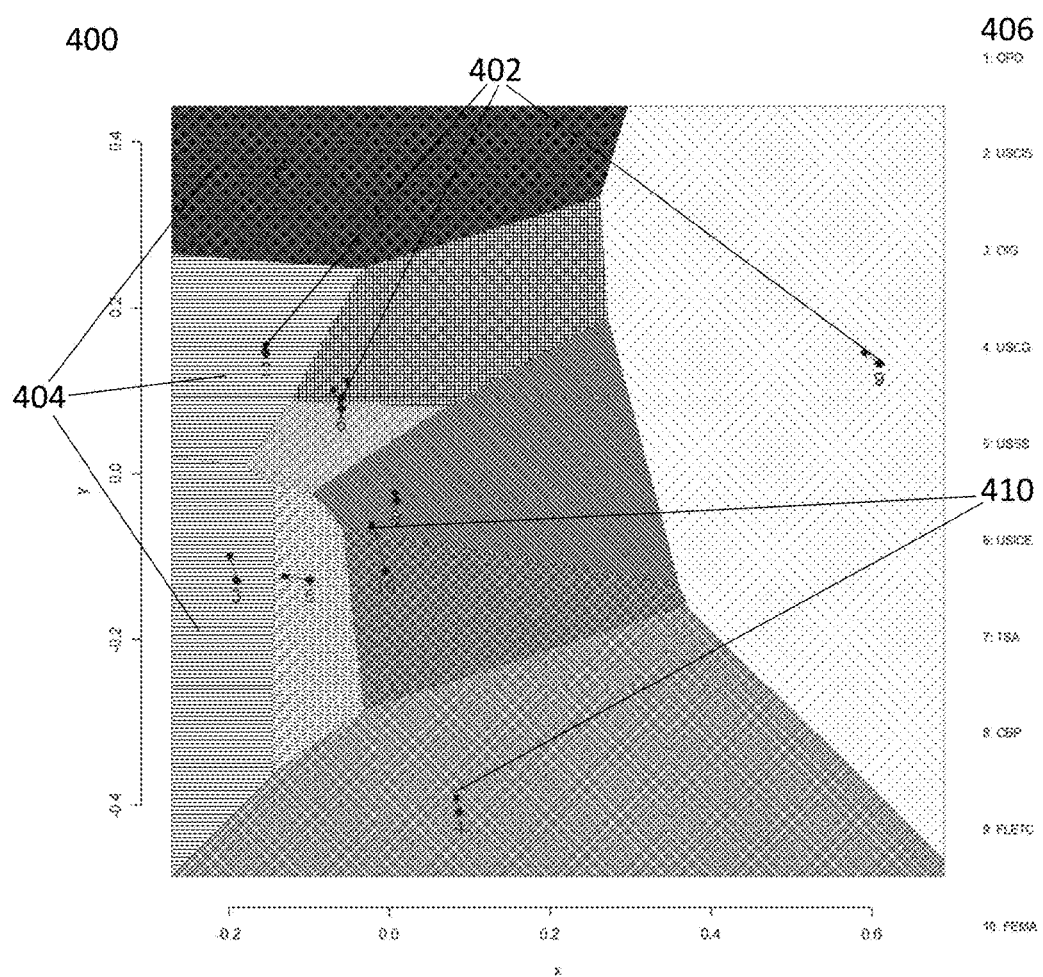
FIG. 4C is an exemplary embodiment of a solution space created in terms of one or more agencies undergoing analysis, for a previous year.

Turning to exemplary FIG. 4C, FIG. 4C may show exemplary embodiment of a solution space 400 created in terms of one or more agencies undergoing analysis, for a previous year. As in FIG. 3C, past data 410 and current data 402 may be provided for each agency or selector.

Figure 5A:
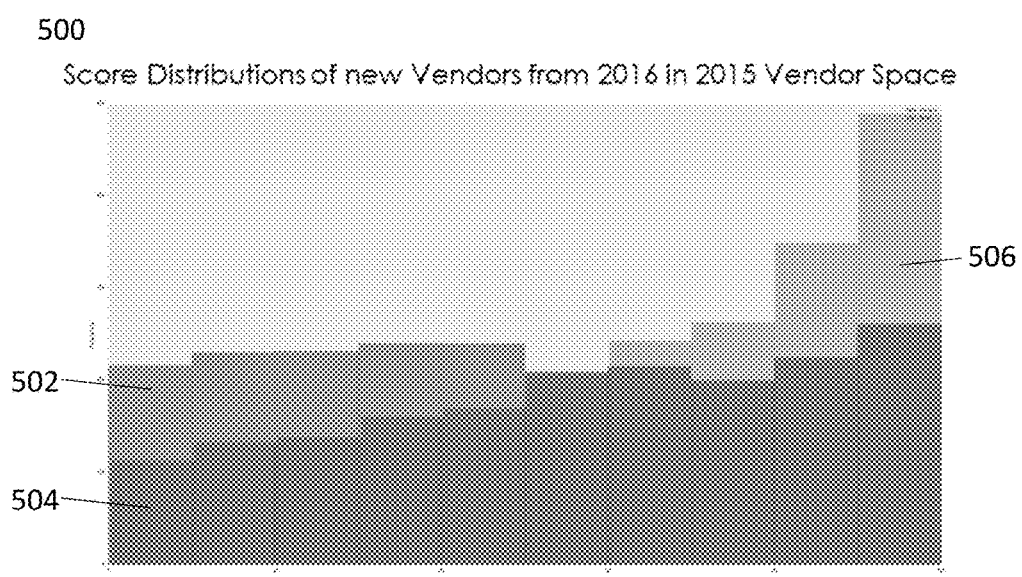
FIG. 5A is an exemplary graph depicting an exemplary set of score distributions.
Figure 5B:
FIG. 5B is an exemplary graph depicting an exemplary set of score distributions.

Turning now to exemplary FIGS. 5A-6B, FIGS. 5A to 6B depict a set of exemplary score distributions for a particular set of vendors or other selectees. Looking first at exemplary FIGS. 5A and 5B, FIGS. 5A and 5B depict an exemplary score distribution chart 500 for a set of new vendors, as computed based on vendor information (FIG. 5A) and contract information (FIG. 5B). In the exemplary embodiments, a uniform random distribution may be shown as element number 502, an overlap space between the uniform random distribution and the scores may be shown as element number 504, and the scores may be shown as element number 506, which may indicate whether the distribution of scores deviated from the uniform random distribution and by how much. This may allow for the evaluation of a data set.

Figure 6A:
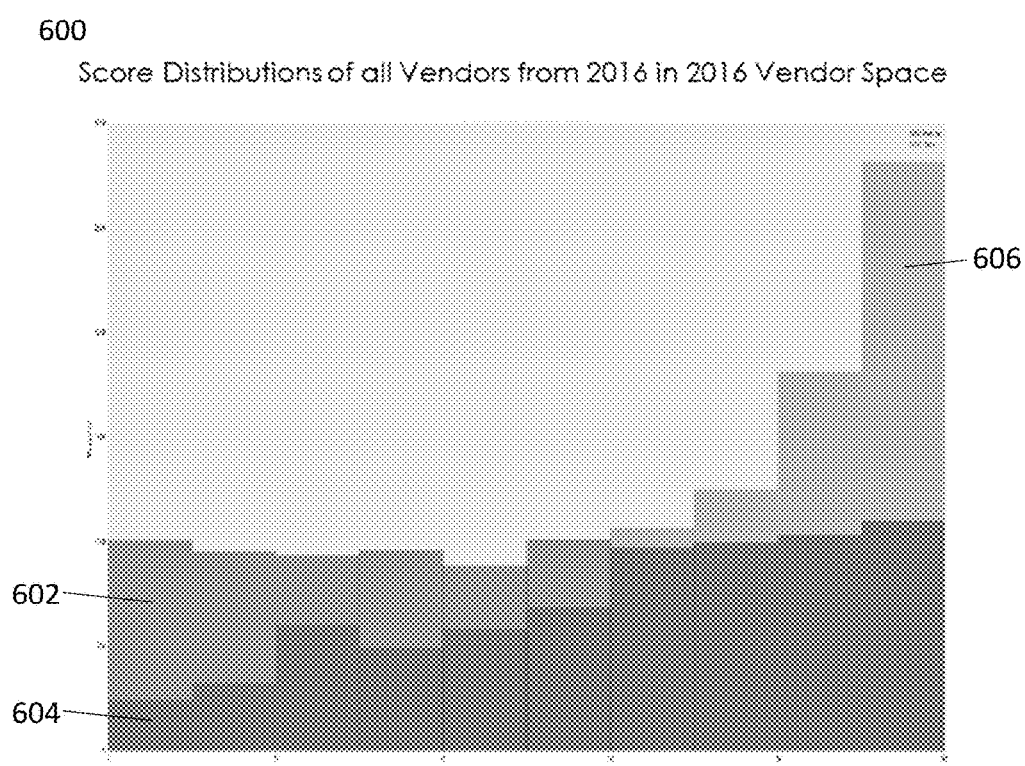
FIG. 6A is an exemplary graph depicting an exemplary set of score distributions.
Figure 6B:
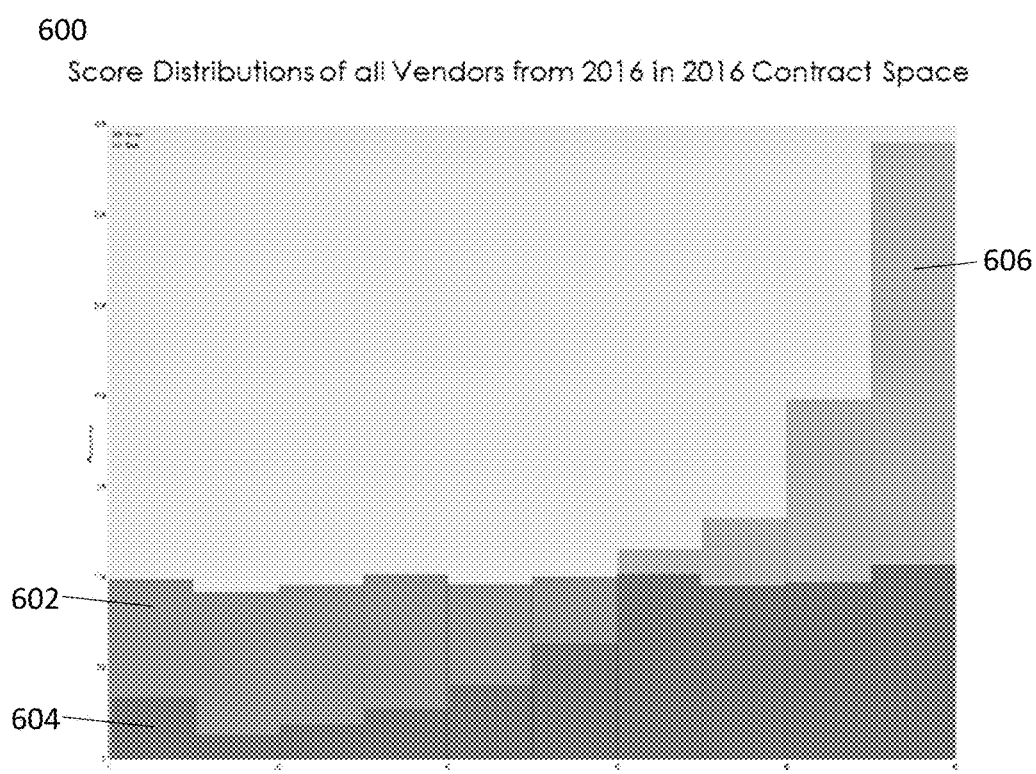
FIG. 6B is an exemplary graph depicting an exemplary set of score distributions.

Turning now to exemplary FIGS. 6A-6B depict an exemplary score distribution chart 600 for a set of all vendors, as computed based on vendor information (FIG. 6A) and contract information (FIG. 6B). As before, in the exemplary embodiments, a uniform random distribution may be shown as element number 602, an overlap space between the uniform random distribution and the scores may be shown as element number 604, and the scores may be shown as element number 606, which may indicate whether the distribution of scores deviated from the uniform random distribution and by how much.

Figure 7A:
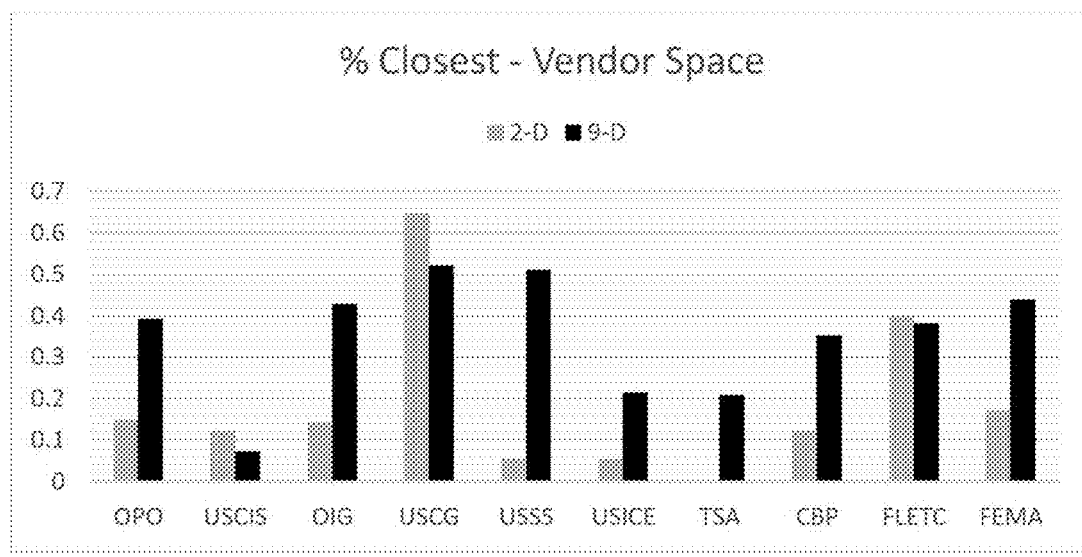
FIG. 7A is an exemplary graph comparing two-dimensional and nine-dimensional embodiments of a solution space.
Figure 7B:
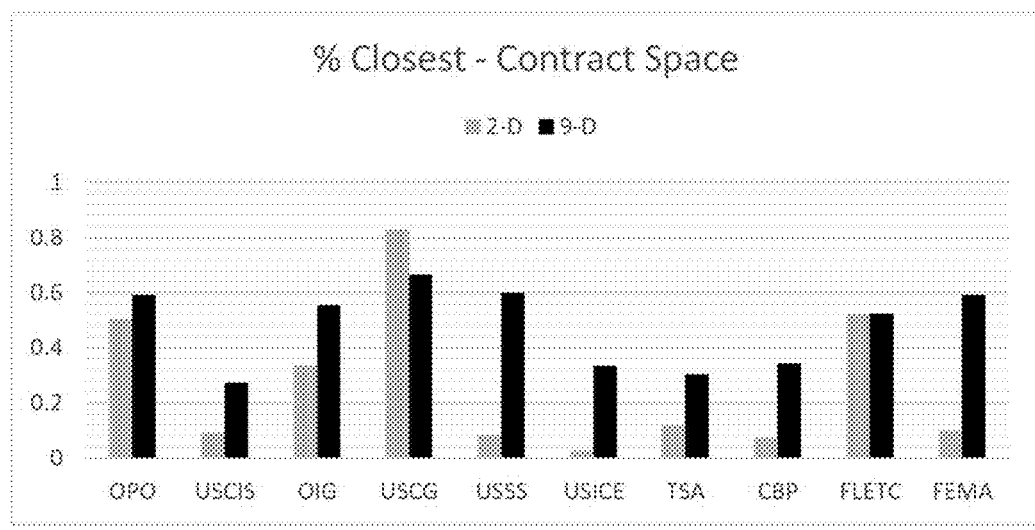
FIG. 7B is an exemplary graph comparing two-dimensional and nine-dimensional embodiments of a solution space.

FIGS. 7A and 7B are exemplary graphs comparing two-dimensional embodiments of a solution space (such as may be depicted in FIGS. 3A-3C and FIGS. 4A-4C) to nine-dimensional embodiments of a solution space, such as may be employed based on the number of agencies analyzed. Specifically, the exemplary graphs may show the percent of the time that the closest vendor was selected by an agency to perform a contract when vendor data (in the form of organizational attributes) was used (FIG. 7A) and the percent of the time that the closest vendor was selected by an agency to perform a contract when past contract data (in the form of contractual attributes) was used (FIG. 7B).

Based on the graphs, it can be seen that only some of the variation in the solution space can be accounted for by the simplified two-dimensional graphs. Specifically, it may be noted that the two-dimensional plot that made use of vendor data accounted for 35.4371% of the total variation in the data (as compared to the 9-dimensional model), and the two-dimensional plot that made use of contract data accounted for 38.4009% of the total variation in the data. (It should, however, be noted that in isolated cases, such as for the US Coast Guard, the two-dimensional model shown in the plots actually offered superior performance.)

It may be understood from the graphs shown in FIGS. 7A to 7B that any intermediate range of dimensions, between 2 and 9 dimensions, may also be used for the data set in question. Other dimensional ranges may be appropriate for other data sets, as may be desired.

Figure 8A:
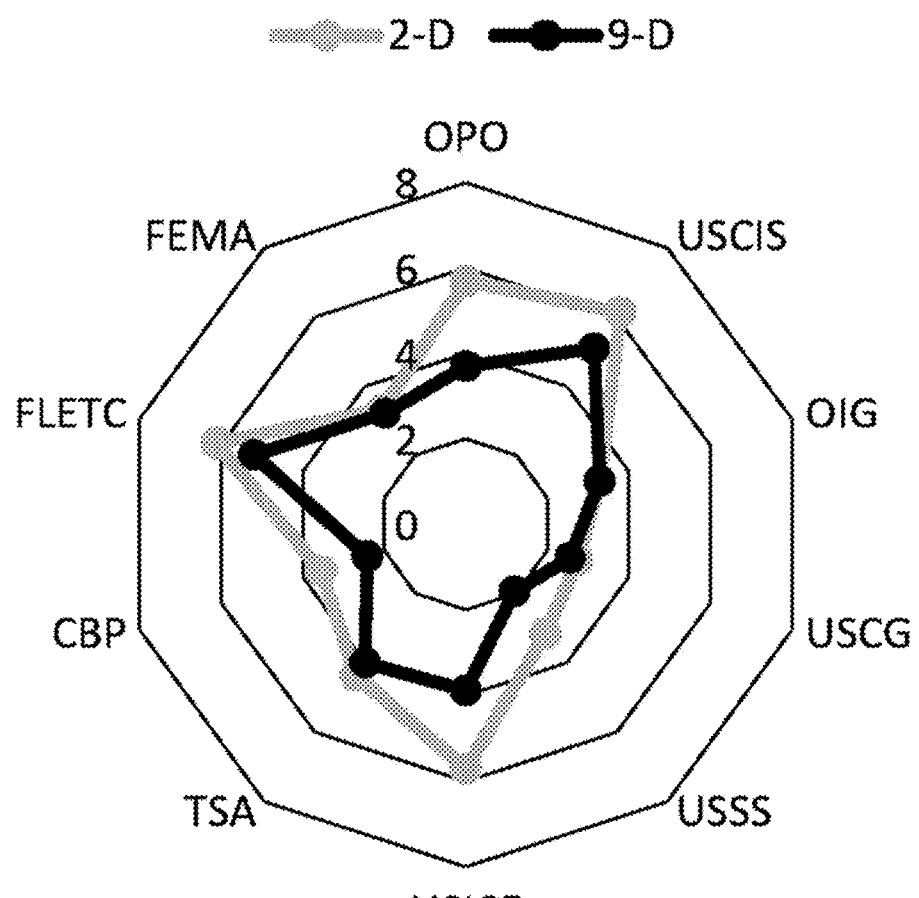
FIG. 8A is an exemplary graph comparing two-dimensional and nine-dimensional embodiments of a solution space.
Figure 8B:
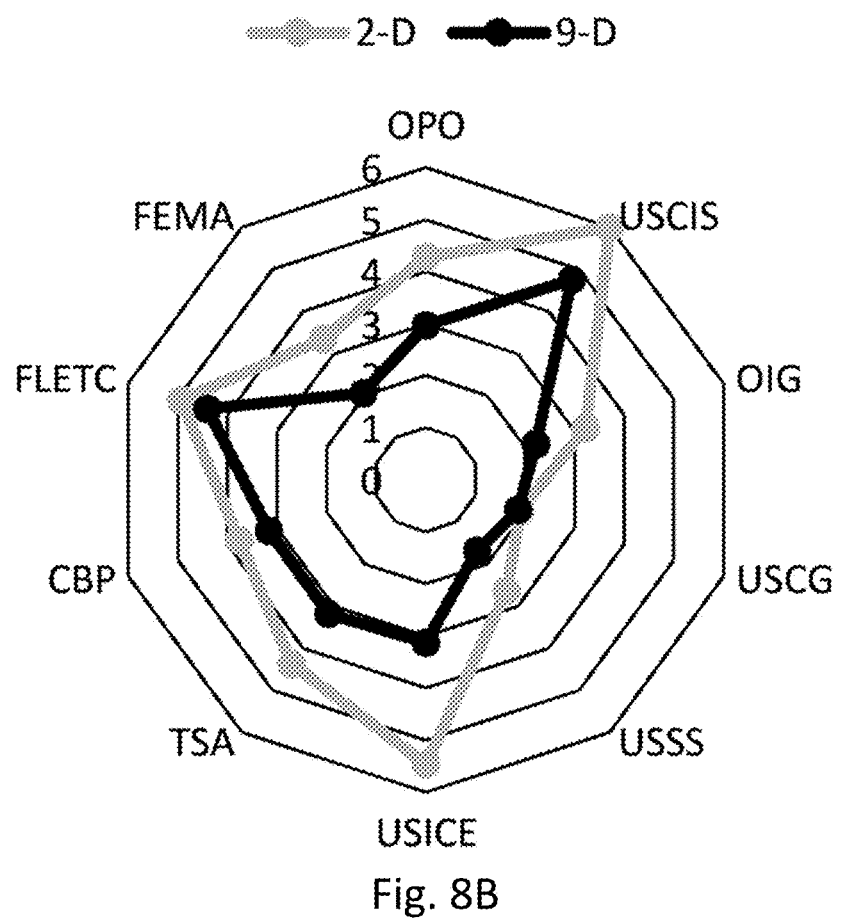
FIG. 8B is an exemplary graph comparing two-dimensional and nine-dimensional embodiments of a solution space.

Turning now to exemplary FIGS. 8A and 8B, FIGS. 8A and 8B are exemplary graphs comparing two-dimensional and nine-dimensional embodiments of a solution space. According to an exemplary embodiment, the exemplary graphs depicted in FIGS. 8A and 8B may feature the same agencies as were featured in the previous graphs, each of which may have an average vendor rank based on the data computed previously.

FIGS. 8A and 8B may show that, in the general case, the average ranks of vendors in terms of 9-dimensional distances (no matter if vendor data/selectee data is used as in FIG. 8A, or if contract/transactional data is used as in FIG. 8B) are at worst equal to and at best highly superior to the average ranks of the vendors in terms of 2-dimensional distances. As such, it may be understood that the choice of a higher number of dimensions may be superior where applicable.

The previous material therefore describes certain exemplary embodiments as to how a vendor matching engine may generate a matchability score that may then be used to produce one or more recommendations for a particular vendor. However, in some exemplary embodiments, it may be desirable to give even greater business intelligence or the capacity for even greater business intelligence to a particular vendor. For example, according to an exemplary embodiment, a vendor may also have some ability to customize a matchability score, if desired. In an exemplary embodiment, a vendor may submit a request for a score of their company for a specific government entity, and may identify one or more probable competitors. According to an exemplary embodiment, an output may then be provided to the vendor based on the probable competitors that they have provided; for example, the vendor may be provided with a subset of the score table that has each of the identified competitors, or may be provided with a vendor score that is based in some part off of the competitors that were provided to the system.

According to an exemplary embodiment, it may be desirable to provide this information or other comparative information to a vendor that has requested a matchability score. Turning now to exemplary FIG. 9, FIG. 9 provides an exemplary flowchart depicting an exemplary embodiment of a process of generating an optimality index using a vendor matching engine 900, which may be used to provide additional business intelligence about the likelihood of a business being compatible with one or more particular government entities and a degree to which they would be compatible.

Figure 9:
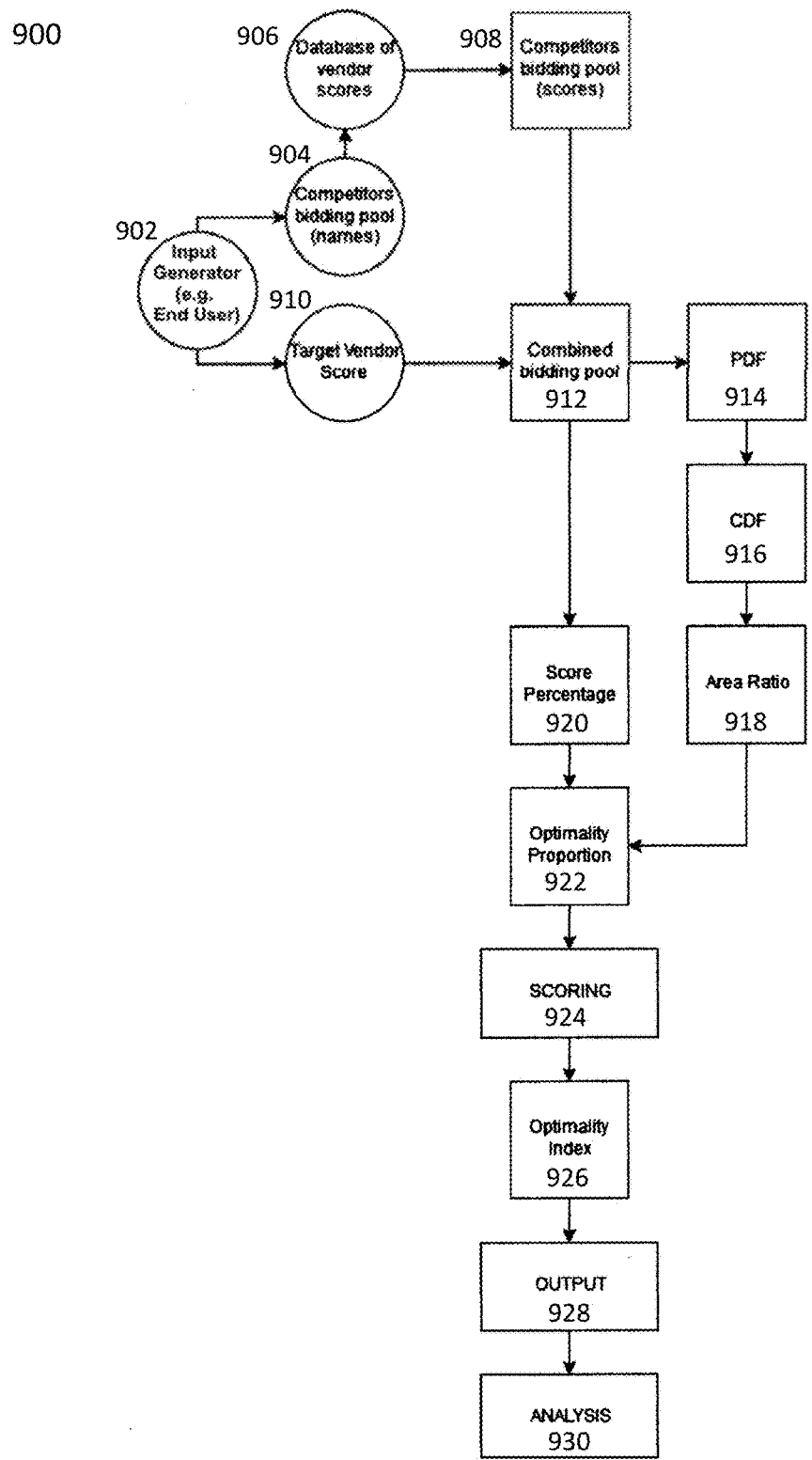
FIG. 9 is an exemplary flowchart depicting an exemplary embodiment of a process of generating an optimality index using a vendor matching engine.

To provide some summary of the output of a vendor matching engine 900 in the exemplary embodiment shown in FIG. 9, it may be understood that an optimality index 926 (which may alternatively be represented as an optimality score, or as both an optimality score and an optimality index 926) is a separate quantitative representation from the matchability score generated in the previous cases. An optimality index 926 may allow vendors or other selectees to create possible completion scenarios and allow for a quantification of said scenarios, which may allow the selectee to compare the scenarios between them. A higher optimality index 926 or higher optimality score (which may each henceforward be referred to as an optimality index 926) may indicate that a particular scenario is better or more favorable for the vendor or other selectee that is generating said scenario or which has been targeted in said scenario (if the selectee under analysis is other than the generating party, such as if the selectee is a vendor being analyzed by one of its competitors). In some exemplary embodiments, a vendor or other selectee may then make use of these scenario outcomes in order to compare between solicitations that the selectee is presently interested in pursuing; in some exemplary embodiments, a vendor matching engine may facilitate such a comparison by generating and providing one or more recommendations based on the scenario outcomes, automatically generating one or more optimal scenario outcomes for a particular vendor, or providing a simple recalculation interface by which a vendor can adjust the conditions of the scenario in order to produce a different outcome.

In an exemplary embodiment, a process for generating an optimality index using a vendor matching engine 900 may be executed after one or more matchability scores have been generated. According to an exemplary embodiment, a matchability score generator and an optimality index generator may be provided as part of an integrated system (such as a vendor matching engine) which may aid vendors, grant pursuing organizations, and other such selectees in identifying which solicitations are most worth pursuing, and then subsequently pursuing solicitations based on quantitative measures.

For example, according to an exemplary embodiment of a combined system, a system may first retrieve and process all historical data that may be available to it, such as, for example, vendor or selectee data from a vendor registry and transactional data from a transaction registry. This may be used to generate one or more matchability scores between the vendor or selectee and one or more selectors, such as government agencies. Once the matchability scores have been generated, the system may be configured to automatically search a database of currently active solicitations from selectors (such as government agencies) and process some or all of the currently active solicitations in order to determine the matchability scores of these currently active solicitations.

Some or all of these existing currently active solicitations may then be provided to the vendor or other selectee. For example, a selection of the currently active solicitations for which the vendor or selectee has the highest score may be provided to the vendor or selectee as prioritized solicitations for which it is recommended that the vendor or selectee apply. In an alternative exemplary embodiment, all active solicitations may be provided with a score, and one or more search utilities may be provided to the vendor or selectee so that they can themselves select a recommended set of active solicitations (such as the most recently posted active solicitations, the most recommended set of active solicitations in their local area, or some other subset of the full set based on some criteria that they may define). In an exemplary embodiment, a vendor or other selectee may be able to provide sufficient vendor details to the vendor matching engine to allow the vendor matching engine to automatically prepare or even automatically submit an application for the solicitation if it has some defined set of criteria, such as, for example, having a matchability score over a certain level or having both a matchability score over a certain level and being within a certain geographical distance.

Moving forward, once the one or more matchability scores have been generated, the vendor matching engine may then be configured to apply this material forward in the generation of an optimality index 900. For example, according to an exemplary embodiment, a vendor matching system that is configured to perform a process for generating an optimality index 900 as depicted in exemplary FIG. 9 may, for example, be used to create various competition scenarios and quantify them by making use of the optimality index. A user may then compare hypothetical scenarios, and from that, ultimately, existing currently active solicitations, by making use of the optimality index.

According to an exemplary embodiment, an optimality index may be generated for a particular vendor or grant receiving organization 900, which may provide a quantitative measurement of the degree of optimality that may be presented by a hypothetical bidding situation for that particular vendor. (According to another exemplary embodiment, an optimality index may also be generated for a particular government entity or grant funding organization, which may be used to provide an indexed list of potential or optimal vendors for that government entity or grant funding organization, if desired.)

According to an exemplary embodiment, an optimality index may be generated by generating a score for a particular vendor, identifying all of the other vendors that are included or likely to be included in a bidding situation, and generating the scores for all of those other vendors as well. Once all of these scores have been calculated, a distribution of the vendor scores may be determined. By analyzing the distribution of these vendor scores in a bidding pool that corresponds to a particular government contract or grant application, and ranking the results that may be obtained by doing so, the vendor may be provided with an index that encapsulates insights regarding the possible competition that they face. In a situation in which the vendor is constrained in terms of resources, or when the contracts at issue are relatively small or numerous and the Requests for Proposal cannot be analyzed cheaply or efficiently, the vendor may thus be provided with a selection of contract solicitations and grant applications that may be most optimal to pursue, enabling an objective evaluation of various opportunities. This may significantly streamline the bidding process for vendors, allowing them to pursue contracts that they would not otherwise find worth their while (such as small contracts for a particular service that they can provide). This in turn may reduce the need for subcontracting, open the pool of potential contractors, improve government efficiency, and reduce waste.

According to an exemplary embodiment, a vendor matching engine or other system may be used to generate an optimality index in any applicable scenario other than a government contract. For example, according to an exemplary embodiment, an optimality index may be generated for a private solicitation of bids (for example, from a large company looking for a subcontractor, or even from a private citizen looking for a service) rather than a public solicitation of bids. For example, it may be used to identify an optimality index of one or more employees to be hired, one or more positions to be pursued or accepted, one or more investment opportunities, one or more prospective students to be accepted into an educational institution, one or more educational institutions to be applied to, and so forth.

According to an exemplary embodiment, a vendor matching engine may be configured to generate an optimality index based on the following logic. In a first step, an input generator 902 (such as an input program or an end user operating a terminal device) may provide an input directed to certain data that is relevant for generating an optimality index 928. This may include, for example, a target vendor score 910, a set of one or more competitors in a bidding pool 904, and a database of vendor scores 906.

According to an exemplary embodiment, an end user or other input generator may, for example, select one or more competitors in a bidding pool to be analyzed, which may represent a list of other vendors that could potentially be bidding on the same contract or applying to the same grant as the target vendor. For example, according to an exemplary embodiment, an end user 902 may provide an input of a list of vendor names, which may be obtained from the target vendor or may be selected by the end user 902 from a provided list of eligible or likely competitors. This list of vendor names may be, for example, a subset of vendor names that may be provided in the database of vendor scores 906 and which may be associated with one or more vendor scores. The input generator 902 may also provide a target vendor score 910, which may provide identifying information about the target vendor, which may be a vendor that the input generator 902 represents or may be another vendor. (For example, it may be possible for the end user to run the vendor matching engine from the perspective of one of their competitors in order to identify which bids their competitors are likely to contest, in order to better prioritize which bids the end user's own company is making.)

According to an exemplary embodiment, once an input generator 902 has provided an input and once relevant data has been acquired about the target vendor score 910 and about the competitors of the target vendor 908, a combined bidding pool 912 may be formed. According to an exemplary embodiment, a combined bidding pool 912 may be a pool of all of the vendor scores corresponding to the vendors within the bidding pool of competitors for the end user 902, which may also contain the score of the target vendor 910. According to an exemplary embodiment, the combined bidding pool 912 may be provided in the form of a list which has been sorted by vendor score.

Once a combined bidding pool 912 has been generated, a vendor matching engine may generate a probability density function 914 for the combined bidding pool 912. According to an exemplary embodiment, a vendor matching engine may make use of, for example, a kernel density estimation (KDE) technique in order to estimate the probability density function 914 of the distribution of scores (including the target vendor score 910 and the scores of competitors) in the combined bidding pool 912.

For example, according to an exemplary embodiment in which a kernel density estimator is used in order to estimate a probability density function, a kernel density estimator function may be provided as follows, for a sample ($x_1 \ldots x_n$):

$$\hat{f}_\square(x) = \frac{1}{n\square} \sum_{i=1}^{n} K\left(\frac{x - x_i}{\square}\right)$$

wherein $\hat{f}_\square(x)$ is an estimate of the shape of the probability density function $f$ (914), K is the kernel (a non-negative function integrating to one), and h is a smoothing parameter called the bandwidth (h>0). In some exemplary embodiments, it may be desirable to choose as low a value for the smoothing parameter h as may be allowed by the data; however, according to other exemplary embodiments, a higher value of h may be chosen.

Once a probability density function 914 has been calculated for the data set, a cumulative distribution function 916 may be calculated using the probability density function 914, for example as an integration of the probability density function 914.

Once a cumulative distribution function 916 has been calculated, estimated cumulative distribution function (CDF) values may be generated for each of the scores of the vendors in the combined bidding pool. It may then be determined which is the highest score in the combined bidding pool 912 or in the bidding pool of competitors' scores 908, and this value may be retrieved. An estimated cumulative distribution function value may then be obtained for the target vendor.

Once it is known what the estimated CDF scores are of the target vendor and the highest score in the bidding pool of scores (such as competitors' scores), an area ratio 918 may be calculated. This area ratio 918 may be a ratio between a function of the estimated CDF value of the score of the target vendor and the estimated CDF value of the score of the highest-scoring bidder in the bidding pool of competitors' scores. (In some exemplary embodiments, the score of the target vendor may in fact be the highest score in the combined bidding pool 912; in such an exemplary embodiment, it may be desirable to have the area ratio 918 be 1, in order to indicate that the target vendor has the highest score in the bidding pool, or may be desirable to have the area ratio 918 be over 1, in order to indicate that the target vendor has surpassed its competitor and by how much.)

According to an exemplary embodiment, concurrently with (or before or after) the calculation of an area ratio 918 value, a score percentage 920 may also be calculated. According to an exemplary embodiment, a score percentage 920 may be a ratio of the scores of the target vendor and the highest score in the combined bidding pool 912, expressed as a percentage. (According to an exemplary embodiment, in the event that the target vendor has the highest score in the combined bidding pool 912, the score percentage 920 may be 100%, while in the event that the target vendor does not have the highest score in the combined bidding pool 912, the score percentage 920 may be less than 100%.)

According to an exemplary embodiment, once an area ratio 918 and a score percentage 920 have been calculated for a target vendor, a raw optimality value 922 or optimality proportion may be calculated, based on the area ratio 918 and the score percentage 920 for that target vendor. According to an exemplary embodiment, an raw optimality value 922 may be a product of the score percentage 920 and the area ratio 918, or may be a function of one or both, for example instead being a product of the score percentage 920 and a function of the area ratio 918.

Once this raw optimality value 922 has been calculated for the target vendor, and optionally for any other vendors for which it may be desired to calculate an raw optimality value 922 (such as, for example, specifically flagged competitors that a vendor is particularly interested in observing), an optimality index 926 may be calculated in a scoring step 924.

According to an exemplary embodiment, an optimality index 926 may be calculated during a scoring step 924 by a determination of the maximum possible value of the raw optimality value 922, and a rank transformation of the raw optimality value 922 that was actually derived with respect to the maximum possible value of the raw optimality value. (This maximum possible value may be derived based on a determination of the best possible hypothetical bidding situation from the perspective of the target vendor, or from the perspective of any other target vendor, such as may be desired.)

According to an exemplary embodiment, the raw optimality value 922 and the optimality index may be calculated according to the following equations. The raw optimality value 922 may first be calculated based on the following equation or based on an equation similar to the following:

$$\pi = \left(100 \times \frac{s_v}{\max S}\right) \times e^{-\varphi}$$

wherein $\pi$ represents the raw optimality value 922, $s_v$ represents the score of the vendor that is constructing the scenario for which an optimality index 926 is being calculated, maxS represents the highest score within the pool of bidders in the scenario that the vendor has constructed (note that the vendor themselves can also be the highest-scoring member of this pool, resulting in maxS being equal to $s_v$), e being the natural log base e, and $-\varphi$ being the negative of the area ratio 918.

The optimality index 926 may, in turn, be calculated based on the following equation or based on an equation similar to the following:

$$\Omega = trunc\left(\frac{\pi}{\pi_{max}} \times 100\right)$$

wherein $\Omega$ represents the optimality index 926, $\pi$ represents the previously-generated raw optimality value 922, the trunc( ) function is a function for truncation of a positive real number such that all decimal digits are discarded (which may thus serve as and which may be substituted for, for example, a floor function $\lfloor (\pi/\pi_{max}) \times 100 \rfloor$), and $\pi_{max}$ is a postulated optimal-case maximum possible value of the raw optimality value 922.

According to an exemplary embodiment, $\pi_{max}$ may have a value of 44.3229825938541 (or some other score as may be desired). Such a score for the maximum raw optimality value $\pi_{max}$ may occur in the following scenario: there may be only one other bidder other than the vendor on whose behalf the scenario has been constructed, the vendor's score may be 100, and the other bidder may be 0. (This may represent the most optimal scenario for the vendor in which the bid is actually contested; it may not include the trivial case of the vendor being the only bidder, in which case it may be entirely meaningless to estimate optimality in most if not all cases. Other "most optimal" scenarios may, however, otherwise be envisioned; for example, if a minimum set of requirements for bids to be considered are listed for a vendor or selectee by a government agency or selector, those minimum requirements may be used in order to generate the hypothetical minimum score of another bidder, which may thus be non-zero if meeting the minimum requirements would cause the other bidder to have a non-zero score.) Similar logic may likewise be applied to the construction of an optimality index 926 where parties are other than vendors and government agencies, such as, for example, students and educational institutions.

Once an optimality index 926 has been generated, it may be output in an output step 928. At that point, if desired, additional analysis or data preservation steps 930 may be conducted. For example, according to an exemplary embodiment, it may be desirable to retain one or more constructed bidding pools, in the event that a company currently serving as a target vendor has any intention of bidding for a contract for the same government agency or a similar government agency in the near future. (In some exemplary embodiments, once constructed, a bidding pool may be retained for a certain amount of time in order to simplify such calculations in the future.)

In an exemplary embodiment of an analysis step 930, in the event that one or more bidding pools or other information are retained, one or more comparisons may be executed. For example, according to an exemplary embodiment, it may be desirable to execute a comparison between retained constructed bidding pools, which may for example allow for the relative suitability of a particular target vendor over time to be determined, or may allow for analysis of the behaviors of other companies.

For example, according to an exemplary embodiment, it may be determined that a particular business had previously had a higher optimality index at any point in the past as compared to today, for a particular bidding scenario consisting of a particular set of competing vendors for any of the solicitations issued by a particular governmental entity (for example, federal departments and their constituent agencies, or independent federal agencies), and it may be determined that the cause of this decline in optimality index is that competitor bidders have improved in suitability much faster than the particular business has. As such, though the score of the particular business may have increased in absolute terms, the score of the particular business relative to its competitors may have declined, and a as such its competitors may be more likely to win contracts.

In another example, according to an exemplary embodiment, the bidding pools for a contract or a grant application (or for another such purpose) may be tracked over the course of the lifetime of the contract or grant solicitation, or may be compared with other similar contracts or other similar grants. This may allow a vendor to observe historical trends in which companies have been awarded similar contracts, or which individuals or institutions have been awarded similar grants. The application of historical trend data may allow for more recent data to be given more weight (or less weight, if it has already been given too much) and may allow it to be subjected to more rigorous manual review. For example, if a particular government agency has recently dramatically changed any aspects of its contracting rules or methodology, this change may have affected which firms are most likely to be considered, and this information may be incorporated into the analysis. (For example, data from before this change may be given a much lower weight if it is determined that the change in methodology was significant and affected aspects of the contracting process like which firms would be considered.)

According to an exemplary embodiment, such a vendor matching engine may provide a quantitative measurement of a degree of optimality that may be presented by a bidding scenario, in which the vendor may be competing with other vendors having arbitrarily distributed vendor scores. According to an exemplary embodiment, such a vendor matching engine may be used for any similar purpose, such as, for example, hiring or grant applications. A vendor matching engine may be configured to provide, and allow comparison between, one or more hypothetical scenarios involving a contract, a grant application, or another purpose or application.

In some exemplary embodiments, a vendor matching engine may be configured to operate on one or more levels. For example, according to a first exemplary embodiment, a vendor matching engine may be provided through a web application available to the public. This may allow a user to upload certain information about their company into the web application, and receive results back about the optimality index values that their company has received. Alternatively, a vendor matching engine may be sold, licensed, or otherwise made available to a particular company, and may be provided with more detailed information (because of the lack of potential confidentiality issues as might be presented with uploading information to a web form) that may be used to generate more accurate estimates. A vendor may have some ability to customize the settings of the vendor matching engine, for example by adjusting the settings of the web form or adjusting the computer software.

According to an exemplary embodiment, a vendor matching engine may be configured to provide different types of output. For example, according to an exemplary embodiment, a vendor matching engine may be configured to provide one or more recommendations once a score, such as a vendor score 142 or optimality index 926, has been calculated for a vendor or government entity. For example, if it is determined that a vendor is particularly suitable for a particular contract or contracts offered by a particular government entity (or other firm, such as a contractor looking for subcontractors or the like), the "best" or "recommended" contracts for which the vendor may apply may be provided, in order to allow the vendor to most optimally focus their efforts.

For example, according to an exemplary embodiment, a vendor matching engine may make use of a vendor score 142 or an optimality index 926 in order to generate an estimated likelihood score for a vendor winning a particular contract. In some exemplary embodiments, a vendor may then provide information as to the estimated costs that the vendor will incur by bidding for the contract, and as to the estimated value of the contract to the vendor (which may be, for example, a profit margin of the contract). According to an exemplary embodiment, a vendor matching engine may then combine the estimated costs of bidding for a contract, the estimated likelihood of winning the contract, the estimated profit that the vendor can make by fulfilling the contract, or any other relevant information into one or more contract recommendations. These contract recommendations may provide the vendor with information as to where to prioritize their efforts; for example, if the vendor is determined to be very well suited for bidding on a particular type of contract or contract offered by a particular agency, but the present contracts offered by the agency are of low value to the vendor (because the contract itself is of low value, because the vendor does not expect to be able to achieve a desirable profit margin on the government contract, or for some other reason) then the vendor may be informed of the issue and may be provided with contract recommendations other than these.

In some exemplary embodiments, once scoring information has been generated for a particular vendor, a vendor matching engine may provide contract bid recommendations as requests for proposal are submitted by government agencies. For example, according to an exemplary embodiment, a vendor matching engine may be integrated with a bid aggregation system configured to gather request for proposals as they are submitted by government agencies, may automatically generate or reference vendor scores for those government agencies or those types of contracts, and may automatically generate recommendations to be provided to the appropriate vendors, recommending that they review the appropriate requests for proposals. (In an exemplary embodiment, a vendor matching engine may also be configured to automatically prepare or even submit a bid for one or more RFPs, for example if a vendor score 142 or optimality index 926 is above a certain threshold value.)

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of generating recommendations as to one or more requests for selection to be pursued by a prospective selectee, comprising:
    retrieving, with a processor, from a selector, selectee information, the selectee information comprising at least one of a plurality of transactional variables characterizing one or more transactions of the selectee or a plurality of attribute variables characterizing one or more attributes of the selectee, the selectee information comprising a plurality of initial variables;
    selecting a plurality of selected variables from the plurality of initial variables based on the completeness, imputability, and lack of redundancy of the selected variables, and discretizing and standardizing the selected variables;
    imputing, with a processor, based on one or more variables in the plurality of selected variables and based on predefined logical imputation rules, one or more missing variable values in the plurality of selected variables, and adding the missing variable values to the set of selected variables;
    aggregating the selected variables by an ID variable, determining a number of levels of each of the selected variables other than one or more ID variables and dummifying the selected variables other than the one or more ID variables, and transforming the dummified variables into a table of proportions;
    calculating a plurality of deviations between a plurality of observed selector values in the table of proportions and a plurality of expected selector values, generating a table of selector inertias, performing generalized singular value decomposition on the table of awarding party inertias in order to obtain selector coordinates in a coordinate space, and generating a table of selector coordinates;
    calculating a plurality of deviations between a plurality of observed selectee values in the table of proportions and a plurality of expected selectee values, generating a table of selectee inertias from the plurality of deviations, and performing matrix multiplication of the table of selectee inertias by the table of selector coordinates to yield a table of selectee coordinates;
    calculating a plurality of distances between each selector coordinate pair in the table of selector coordinates and each selectee coordinate pair in the table of selectee coordinates;
    generating a table of selectee scores based on the distances, the table of selectee scores comprising at least a score of the prospective selectee, and customizing the table of selectee scores for the prospective selectee; and
    automatically generating at least one recommendation tailored to the prospective selectee based on the table of selectee scores, based on at least one valuation criterion provided by the selectee.

2. The method of claim 1, wherein the step of generating a table of selector inertias and the step of generating a table of selectee inertias are each calculated using the equation $$s_{i,j} = \frac{(p_{i,j} - r_i c_j)}{\sqrt{r_i c_j}}$$

wherein $s_{i,j}$ is a statistical inertia value, $p_{i,j}$ is a relative frequency value, $r_i$ is a row sum of table of proportion data having a particular row index i, $c_j$ is a column sum of table of proportion data having a particular column index j, and
wherein $$p_{i,j} = \frac{n_{ij}}{n},$$

wherein for a row index i and column index j of the table of proportions, $n_{i,j}$ is a data value at the particular row index i and the particular column index j, and n is a sum of all data values in the table of proportions.

3. The method of claim 1, wherein the prospective selectee is a prospective government contract vendor, wherein the selector is a government entity, and wherein the selectee information comprises request for proposal information for the government entity and award information corresponding to the request for proposal information, the award information comprising one or more selectee attributes.

4. The method of claim 1, wherein the prospective selectee is a prospective grant applicant, wherein the selector is a grant providing agency, and wherein the selectee information comprises one or more grant recipient characteristics.

5. The method of claim 1, wherein the prospective selectee is a job applicant, wherein the selector is a hiring party, and wherein the selectee information comprises one or more characteristics of employees hired by the hiring party.

6. The method of claim 1, wherein the prospective selectee is a company seeking investment, wherein the selector is an investor, and wherein the selectee information comprises one or more characteristics of past companies that have been recipients of investment from the investor.

7. The method of claim 1, wherein the prospective selectee is a prospective student, wherein the selector is a higher education institution, and wherein the selectee information comprises one or more characteristics of students accepted by the higher education institution.

8. The method of claim 1, further comprising:
    adding a new prospective selectee, determining selectee information for the new prospective selectee, and generating a plurality of new selectee variables;
    determining a number of levels of each of the new selectee variables other than one or more ID variables and dummifying the new selectee variables other than the one or more ID variables, aggregating the dummified new selectee variables and generating a new selectee table of proportions, and combining the new selectee table of proportions with the table of proportions;
    calculating new selectee coordinates for the new prospective selectee, the step of calculating new selectee coordinates comprising calculating a plurality of deviations between a plurality of observed new selectee values in the table of proportions and a plurality of expected new selectee values, generating a table of new selectee inertias, and performing matrix multiplication of the table of new selectee inertias by the table of selector coordinates to yield a table of new selectee coordinates;

calculating a plurality of distances between each selector coordinate pair in the table of selector coordinates and each new selectee coordinate pair in the table of new selectee coordinates;

recalculating the table of selectee scores based on the distances, the table of selectee scores comprising at least a score of the prospective selectee; and generating the at least one recommendation tailored to the prospective selectee based on the table of selectee scores, the at least one recommendation comprising information on an adjustment to the at least one recommendation caused by adding the new selectee.

9. The method of claim 1, wherein the step of generating at least one recommendation tailored to the prospective selectee based on the table of selectee scores comprises:

searching a selector database for a plurality of selectors having currently active solicitations, and automatically calculating selectee scores for the plurality of selectors having currently active solicitations;

determining one or more nearby selectors for which the prospective selectee has a selectee score over a predefined threshold; and providing the nearby selectors to the prospective selectee.

10. The method of claim 9, wherein the step of generating at least one recommendation tailored to the prospective selectee based on the table of selectee scores further comprises:

automatically preparing a request for selection for the prospective selectee for at least one selector having a selectee score above the predefined threshold.

11. A vendor matching system comprising a processor, a memory, a network connection, and a display, the vendor matching system configured to provide recommendations to a prospective selectee as to one or more requests for selection to be pursued by the prospective selectee, the vendor matching system configured to perform the steps of:

retrieving, with a processor, from a selector, selectee information, the selectee information comprising at least one of a plurality of transactional variables characterizing one or more transactions of the selectee or a plurality of attribute variables characterizing one or more attributes of the selectee, the selectee information comprising a plurality of initial variables;

selecting a plurality of selected variables from the plurality of initial variables based on the completeness, imputability, and lack of redundancy of the selected variables, and discretizing and standardizing the selected variables;

imputing, with a processor, based on one or more variables in the plurality of selected variables and based on predefined logical imputation rules, one or more missing variable values in the plurality of selected variables, and adding the missing variable values to the set of selected variables;

aggregating the selected variables by an ID value, determining a number of levels of each of the selected variables other than one or more ID variables and dummifying the selected variables other than the one or more ID variables, and transforming the dummified variables into a table of proportions;

calculating a plurality of deviations between a plurality of observed selector values in the table of proportions and a plurality of expected selector values, generating a table of selector inertias, performing generalized singular value decomposition on the table of awarding party inertias in order to obtain selector coordinates in a coordinate space, and generating a table of selector coordinates;

calculating a plurality of deviations between a plurality of observed selectee values in the table of proportions and a plurality of expected selectee values, generating a table of selectee inertias from the plurality of deviations, and performing matrix multiplication of the table of selectee inertias by the table of selector coordinates to yield a table of selectee coordinates;

calculating a plurality of distances between each selector coordinate pair in the table of selector coordinates and each selectee coordinate pair in the table of selectee coordinates;

generating a table of selectee scores based on the distances, the table of selectee scores comprising at least a score of the prospective selectee, and customizing the table of selectee scores for the prospective selectee; and automatically generating at least one recommendation tailored to the prospective selectee based on the table of selectee scores, based on at least one valuation criterion provided by the selectee.

12. The vendor matching system of claim 11, wherein the step of generating a table of selector inertias and the step of generating a table of selectee inertias are each calculated using the equation $$s_{i,j} = \frac{(p_{i,j} - r_i c_j)}{\sqrt{r_i c_j}}$$

wherein $s_{i,j}$ is a statistical inertia value, $p_{i,j}$ is a relative frequency value, $r_i$ is a row sum of table of proportion data having a particular row index i, $c_j$ is a column sum of table of proportion data having a particular column index j, and wherein $$p_{i,j} = \frac{n_{ij}}{n},$$

wherein for a row index i and column index j of the table of proportions, $n_{i,j}$ is a data value at the particular row index i and the particular column index j, and n is a sum of all data values in the table of proportions.

13. The vendor matching system of claim 11, wherein the prospective selectee is a prospective government contract vendor, wherein the selector is a government entity, and wherein the selectee information comprises request for proposal information for the government entity and award information corresponding to the request for proposal information, the award information comprising one or more selectee attributes.

14. The vendor matching system of claim 11, wherein the prospective selectee is a prospective grant applicant, wherein the selector is a grant providing agency, and wherein the selectee information comprises one or more grant recipient characteristics.

15. The vendor matching system of claim 11, wherein the prospective selectee is a company seeking investment, wherein the selector is an investor, and wherein the selectee information comprises one or more characteristics of past companies that have been recipients of investment from the investor.

16. The vendor matching system of claim 11, wherein the prospective selectee is a prospective student, wherein the selector is a higher education institution, and wherein the selectee information comprises one or more characteristics of students accepted by the higher education institution.

17. The vendor matching system of claim 11, wherein the vendor matching system is further configured to perform the steps of:
adding a new prospective selectee, determining selectee information for the new prospective selectee, and generating a plurality of new selectee variables;
determining a number of levels of each of the new selectee variables other than one or more ID variables and dummifying the new selectee variables other than the one or more ID variables, aggregating the dummified new selectee variables and generating a new selectee table of proportions, and combining the new selectee table of proportions with the table of proportions;
calculating new selectee coordinates for the new prospective selectee, the step of calculating new selectee coordinates comprising calculating a plurality of deviations between a plurality of observed new selectee values in the table of proportions and a plurality of expected new selectee values, generating a table of new selectee inertias, and performing matrix multiplication of the table of new selectee inertias by the table of selector coordinates to yield a table of new selectee coordinates;
calculating a plurality of distances between each selector coordinate pair in the table of selector coordinates and each new selectee coordinate pair in the table of new selectee coordinates;
recalculating the table of selectee scores based on the distances, the table of selectee scores comprising at least a score of the prospective selectee; and
generating the at least one recommendation tailored to the prospective selectee based on the table of selectee scores, the at least one recommendation comprising information on an adjustment to the at least one recommendation caused by adding the new selectee.

18. The vendor matching system of claim 11, wherein the step of generating at least one recommendation tailored to the prospective selectee based on the table of selectee scores comprises:
searching a selector database for a plurality of selectors having currently active solicitations, and automatically calculating selectee scores for the plurality of selectors having currently active solicitations;
determining one or more nearby selectors for which the prospective selectee has a selectee score over a predefined threshold; and
providing the nearby selectors to the prospective selectee.

19. The vendor matching system of claim 18, wherein the step of generating at least one recommendation tailored to the prospective selectee based on the table of selectee scores further comprises:
automatically preparing a request for selection for the prospective selectee for at least one selector having a selectee score above the predefined threshold.

20. A method of generating recommendations as to one or more requests for selection to be pursued by a prospective selectee, comprising:
retrieving, with a processor, from a selector, selectee information, the selectee information comprising at least one of a plurality of transactional variables characterizing one or more transactions of the selectee or a plurality of attribute variables characterizing one or more attributes of the selectee, the selectee information comprising a plurality of initial variables;
selecting a plurality of selected variables from the plurality of initial variables based on the completeness, imputability, and lack of redundancy of the selected variables, and discretizing and standardizing the selected variables;
imputing, with a processor, one or more missing variable values in the plurality of selected variables, and adding the missing variable values to the set of selected variables;
aggregating the selected variables by an ID variable, determining a number of levels of each of the selected variables other than one or more ID variables and dummifying the selected variables other than the one or more ID variables, and transforming the dummified variables into a table of proportions;
calculating a plurality of deviations between a plurality of observed selector values in the table of proportions and a plurality of expected selector values, generating a table of selector inertias, performing generalized singular value decomposition on the table of awarding party inertias in order to obtain selector coordinates in a coordinate space, and generating a table of selector coordinates;
calculating a plurality of deviations between a plurality of observed selectee values in the table of proportions and a plurality of expected selectee values, generating a table of selectee inertias, and performing matrix multiplication of the table of selectee inertias by the table of selector coordinates to yield a table of selectee coordinates;
calculating a plurality of distances between each selector coordinate pair in the table of selector coordinates and each selectee coordinate pair in the table of selectee coordinates;
generating a table of selectee scores based on the distances, the table of selectee scores comprising at least a score of the prospective selectee; and
generating at least one recommendation tailored to the prospective selectee based on the table of selectee scores, the step of generating at least one recommendation tailored to the prospective selectee comprising searching a selector database for a plurality of selectors having currently active solicitations, automatically calculating selectee scores for the plurality of selectors having currently active solicitations, determining one or more nearby selectors for which the prospective selectee has a selectee score over a predefined threshold, providing the nearby selectors to the prospective selectee; and
evaluating whether any of the one or more nearby selectors meets a predefined criterion and automatically preparing a request for selection for the prospective selectee for at least one of the nearby selectors that meets the predefined criterion.

* * * * *